US010243368B2

United States Patent
Prinstil et al.

(10) Patent No.: US 10,243,368 B2
(45) Date of Patent: Mar. 26, 2019

(54) UNIFYING ELECTRICAL INTERFACE CONNECTION PLATFORM

(71) Applicants: Ambroise Prinstil, East Hartford, CT (US); Kenneth Louis Martz, Kerrville, TX (US); Timothy Andrew Gallagher, Canton, CT (US)

(72) Inventors: Ambroise Prinstil, East Hartford, CT (US); Kenneth Louis Martz, Kerrville, TX (US); Timothy Andrew Gallagher, Canton, CT (US)

(*) Notice: Subject to any disclaimer, the term of this patent is extended or adjusted under 35 U.S.C. 154(b) by 180 days.

(21) Appl. No.: 15/436,810

(22) Filed: Feb. 19, 2017

(65) Prior Publication Data
US 2017/0250511 A1    Aug. 31, 2017

Related U.S. Application Data

(60) Provisional application No. 62/300,112, filed on Feb. 26, 2016.

(51) Int. Cl.
| | |
|---|---|
| *H02J 3/38* | (2006.01) |
| *H01R 25/00* | (2006.01) |
| *H01R 13/642* | (2006.01) |
| *H01R 33/74* | (2006.01) |
| *H02J 7/00* | (2006.01) |
| *H02J 7/35* | (2006.01) |
| *H01R 43/00* | (2006.01) |

(52) U.S. Cl.
CPC ............ *H02J 3/382* (2013.01); *H01R 13/642* (2013.01); *H01R 25/006* (2013.01); *H01R 33/74* (2013.01); *H02J 3/383* (2013.01); *H02J 7/0052* (2013.01); *H02J 7/35* (2013.01); *H02J 2007/0062* (2013.01); *Y02E 10/563* (2013.01); *Y02E 10/566* (2013.01)

(58) Field of Classification Search
CPC .......... H02J 3/382; H02J 3/383; H02J 7/0052; H02J 2007/0062; Y02E 10/563; Y02E 10/566; H01R 35/006; H01R 13/642; H01R 33/74; H01R 43/00
See application file for complete search history.

(56) References Cited

U.S. PATENT DOCUMENTS

| | | | |
|---|---|---|---|
| 8,341,837 B2* | 1/2013 | Braunstein ........... | H01R 25/006 29/593 |
| 2011/0075326 A1* | 3/2011 | Barnas ................. | H02B 1/056 361/624 |
| 2016/0021779 A1* | 1/2016 | Knight ................. | H05K 7/186 361/679.01 |

* cited by examiner

*Primary Examiner* — Robert L Deberadinis

(57) ABSTRACT

The disclosed Unifying Electrical Interface presents a versatile connectivity platform having the merging capabilities permitting more than a singular voltage, level or type to be made available from an electrical outlet. When wired fully, the choice of AC and/or DC made available to the consumer is broadened. Direct Current (DC) provided via the UEI would originate from a locally based DC source access point obviating the need to use wall chargers or power supplies that wastefully consume energy even when in standby mode. By this approach, the UEI based system extends an avenue for renewable energy technology to be made readily available in a building; while offering a synergistic advantage for the end user, the energy provider and the environment by reducing energy waste. That power conservation and accessibility will result in greater choice and savings for the consumer and will reduce the need for excess production from electric providers.

35 Claims, 18 Drawing Sheets

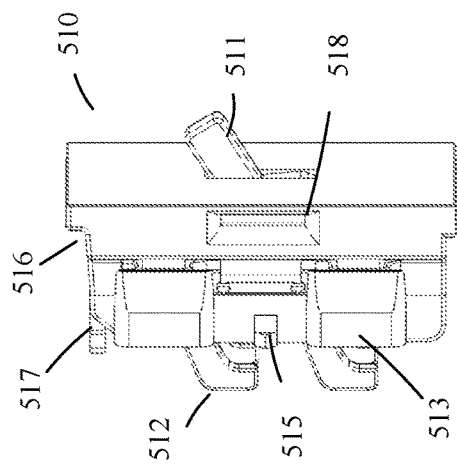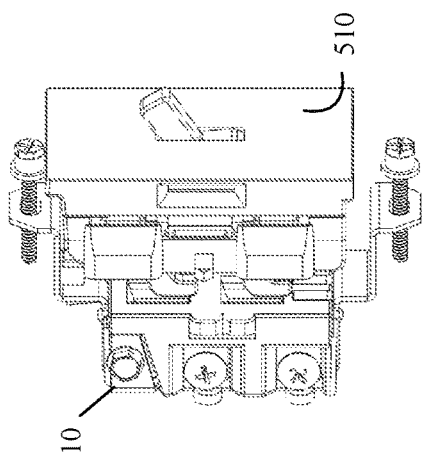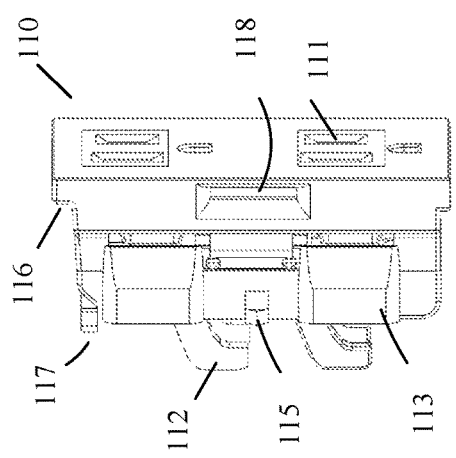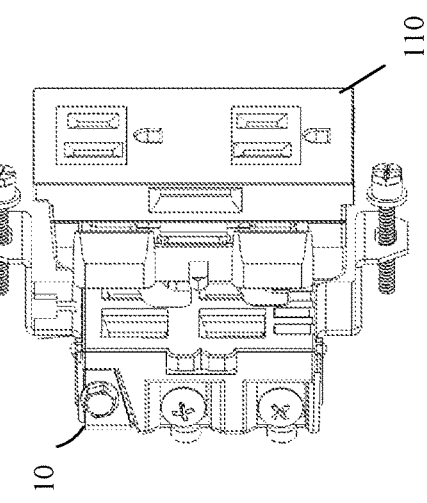
FIG. 4A
FIG. 4B
FIG. 4C
FIG. 4D

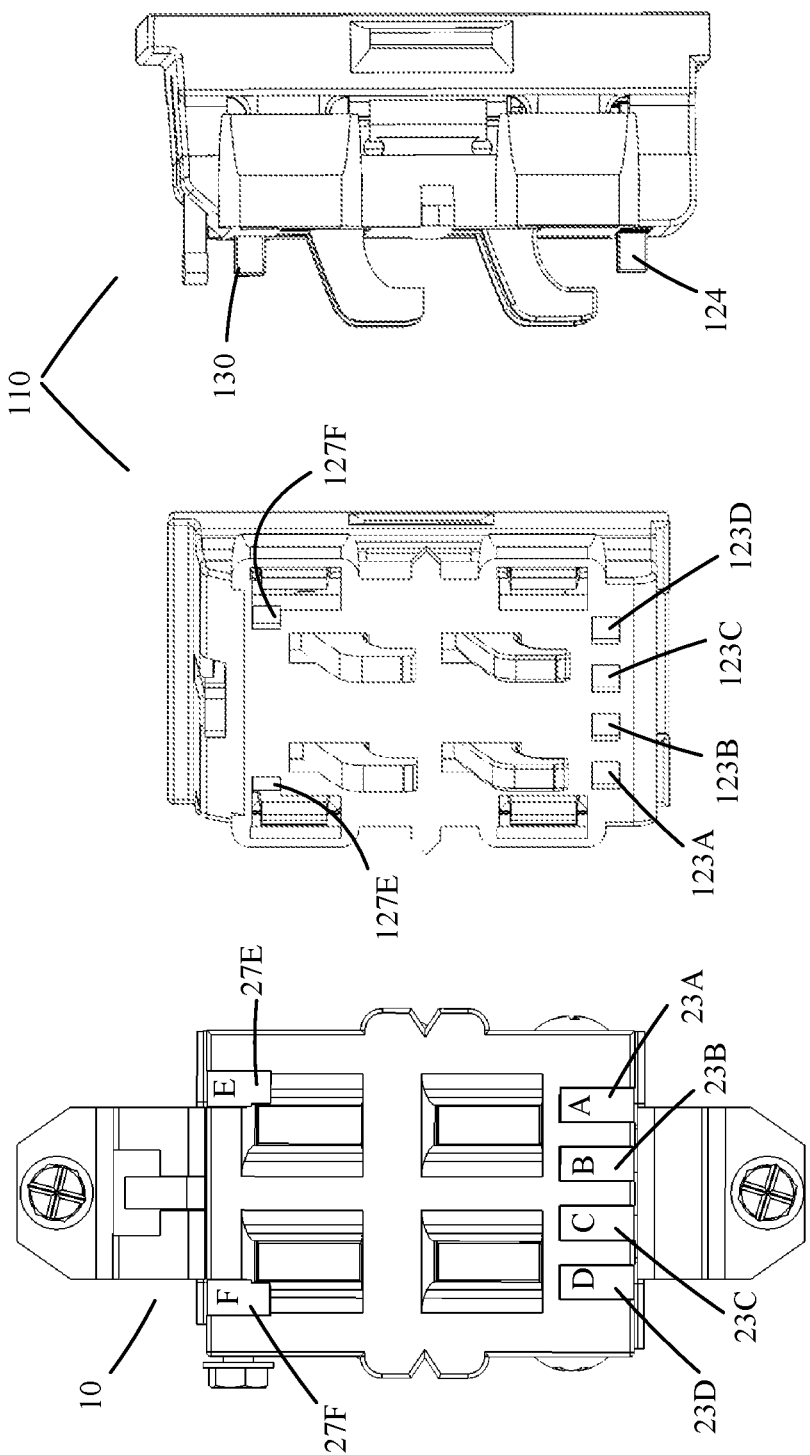

| UEI MODE KEY (F-E) | UEI FEATURE KEY (D-C-B-A) | MODE | DESCRIPTION | COMP FEATURE KEY (A-B-C-D) | COMP MODE KEY (E-F) |
|---|---|---|---|---|---|
| 01 | 0001 | DELTA | ½ SYSTEM VOLTAGE | 1000 | 10 |
| 01 | 0010 | DELTA | SYSTEM VOLTAGE | 0100 | 10 |
| 01 | 0011 | DELTA | 3-PHASE /SYSTEM VOLTAGE / ½ SYSTEM V/HIGH LEG | 1100 | 10 |
| 01 | 0101 | DELTA | HYBRID DELTA AC/DC | 0101 | 10 |
| 10 | 0001 | WYE | PHASE VOLTAGE | 1000 | 01 |
| 10 | 0010 | WYE | SYSTEM VOLTAGE (PHASE V * Sq. Rt. of 3) | 0100 | 01 |
| 10 | 0011 | WYE | 3-PHASE / PHASE VOLTAGE / PHASE V * Sq. Rt. of 3 | 1100 | 01 |
| 10 | 0101 | WYE | HYBRID WYE AC/DC | 0101 | 01 |
| 11 | 0100 | DC | DC | 0010 | 11 |
| 11 | 1000 | SWITCHES | ALL SWITCHES | 0001 | 11 |
| 11 | 1001 | SPECIAL | AC POWERED SPECIAL FUNCTION | 1001 | 11 |
| 11 | 1100 | SPECIAL | DC POWERED SPECIAL FUNCTION | 0011 | 11 |

UEI 0 = CLOSED CAVITY        OUTLETS / SWITCHES 0 = NO PEG

UEI 1 = OPEN CAVITY          OUTLETS / SWITCHES 1 = PEGED

TABLE 1

FIG. 8

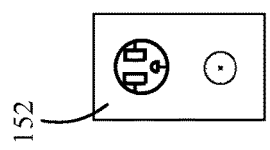
FIG. 10D
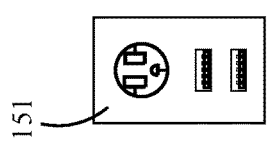
FIG. 10B
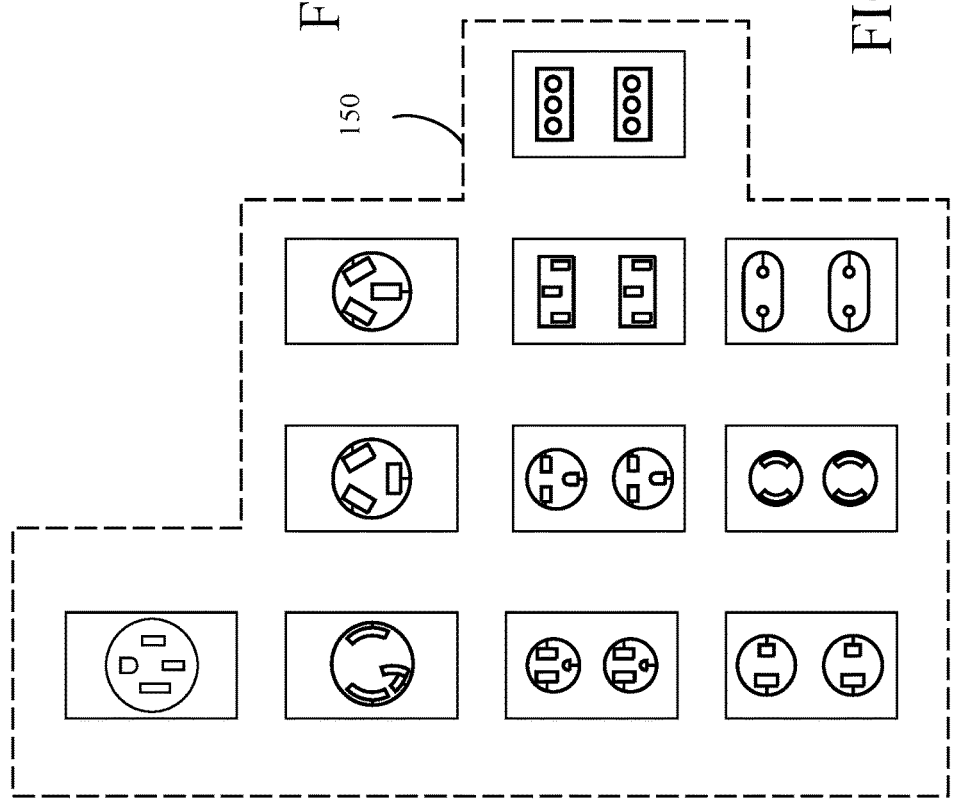
FIG. 10E
FIG. 10C
FIG. 10A

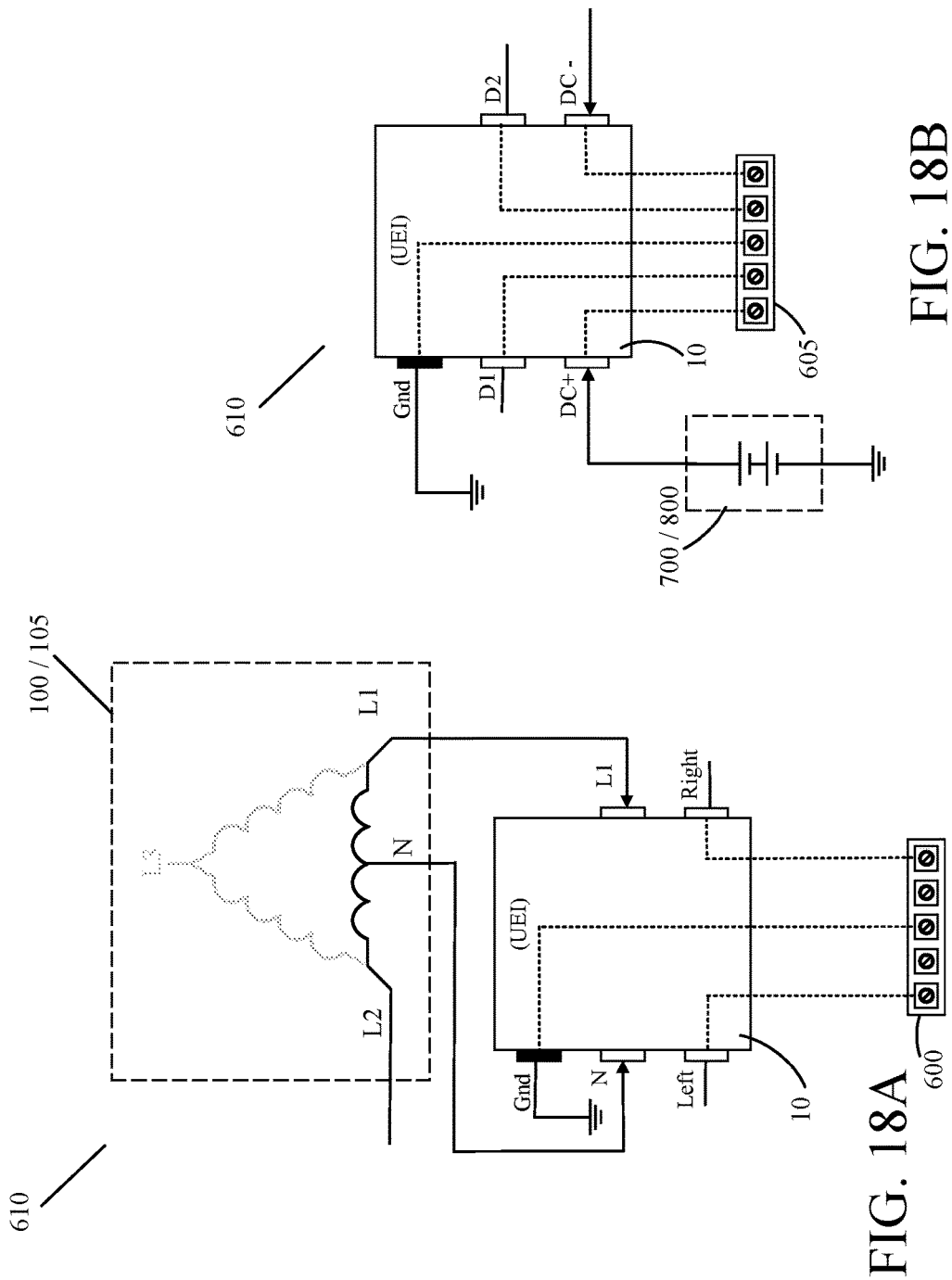

UNIFYING ELECTRICAL INTERFACE CONNECTION PLATFORM

PRIORITY CLAIM

The application described within claims the benefit of U.S. Provisional Patent Application Ser. No. 62/300,112, filed Feb. 26, 2016, which application is hereby incorporated by reference.

FIELD OF THE INVENTION

This present invention pertains to a Unifying Electrical Interface (UEI) which is a connection platform to be used to broaden the choice of voltages AC and/or DC that can be obtained from a single unified base to facilitate interconnection between electrical equipment to their respective power source in a given country or region.

BACKGROUND OF INVENTION

Finding a way to easily replace outlets and switches has been an objective that others have attempted to resolve. In U.S. Pat. No. 2,908,743 granted to Robert T. Premoshis in 1959, a modular approach was taken to quickly perform that task. Subsequently, other similar approaches were also taken, such as U.S. Pat. Nos. 6,341,981, 7,666,010 and 7,762,838, among many others, to quickly install and remove outlets and switches. These approaches, however, would only provide the consumer with quick access to the existing power distribution platform. In this present invention, however, the focus is on the fact that the end user will gain access to a broader supply capability offered by this newly presented platform. It will include many more options not presently made available by means of previously cited patents. All of this can be accomplished without a need for tools or to de-energize the line.

This patent seeks to address the non-universality problem where each country or region adopts its own outlet standard for power delivery. With this new invention, a platform is provided upon which the various standards can share a common base. In addition, a much wider range of AC and DC will be made available via the UEI and its unifying capability to make accessible most of the world's common electricity standards of AC as well as DC into a single standardized environment.

Worldwide, many methods are used in the generation and distribution of electricity. Hydropower, nuclear power facilities, and fossil based stations are located in remote places for obvious reasons such as availability, safety and health. Some can be hundreds of miles away from the substation that handles the energy distribution to residential or industrial places. For that reason, alternating current (AC) was found to be the best suited electrical supply format for a distribution approach because of its ability to be transmitted over very long lines without much loss in the transmission. Meanwhile, most equipment in use today require DC for their operation. To satisfy that majority, the power used, in most cases, needs to be converted from AC to DC.

Another aim of this patent is to offer a local delivery path for DC, either stored or generated from any of the renewable energy technology methods, to be delivered directly into buildings. This will obviate the need for the back and forth conversion presently being done to bring DC to most equipment in use. One major mistake associated with inverting all DC generation into AC is the fact that most of the renewable power generated is then transferred to the AC grid. This is done because the current electrical delivery infrastructure is setup to work only with AC. That limitation leaves the power consumers vulnerable and in the dark if anything happens to the AC power grid. Also, use of DC in a structure does offers the added advantage of having an alternate power stream that is isolated from the AC power grid. Separating the AC path from that of the DC allows the user, by way of the UEI platform, to retain a measure of power functionality in the event of a natural disaster or a criminal attack (cyber-attack) on the AC power grid.

Yet another aim is to seek to promote the need to convert all the various types of outlets and switches in use throughout the world into hook-on units that can work with the aforementioned UEI platform to facilitate uniting all the standards from a given country or region into a single environment. This will, as the previously mentioned patent, granted to Premoshis, dated from 1959, facilitate repairs and upgrades without the need to retain the services of a professional. Also, it will offer the added benefit that sets it apart from previous modularity approaches, namely its ability to broaden the choice of voltages, formats to be obtained from a single hub while promoting energy conservation. All of those benefits can be accomplished without having to turn off the circuit breaker for a particular line needlessly resetting other equipment connected on the same line. This will enable the ability to hot swap components when the base UEI platform is already in place and fully wired.

The conventional conversion of AC to DC procedure, among other components, involves the use of power transformers which are, for the most part, always connected to the line even when the equipment they are intended for are not connected as a load. Many battery operated electronic devices in this day and age such as cellular phones, tablets, toys and small devices of that category require daily recharging. Such devices are provided with a charger adapter which is plugged into the AC outlet to convert AC into the DC needed for their charging and operation. For the most part, those charging devices are left connected to the AC outlet electrical supply around the clock. Although a case could be made that the consumption for a single charging device amounts to an almost insignificant power use, but if each household, office building and industrial facility has multiples of such charging devices always connected to the power grid, it amounts to a very significant waste of power. This unnecessary power consumption is cumulatively a wasteful burden to the power grid contributing to pressure on energy providers to expand the capacity of the grid to accommodate this excessive and wasteful power usage. Lessening that waste will help promote energy conservation and save money for both the energy provider and the consumer while having a positive impact on the environment.

The abovementioned small devices constantly in need of being recharged have one thing in common, they all have an underlying need of a DC charger to operate. The standard in place requires the conversion of AC into DC at the level needed for their equipment. Some equipment only needs a 5V supply providing between 600 to 5000 mA for their operation. This low power level represents a constraint for most devices using Direct Current since the need may be much higher such as for a portable computer, which may require 12 VDC or more. To overcome that limitation, the output component in use by the proposed platform, whether a USB port, a cigarette lighter or whatever other future connectivity formats yet to come, will be set to have its own power capability built into it. The option can be made available that a switchable power capability may be built into a particular hook-on outlet unit as well.

Due to the increase in electrical energy demand, many countries are promoting the use of renewable power generation to help offset the carbon footprint associated with conventional electricity generation, which often uses fossil based fuel in their energy production. Renewable energy technological advances have facilitated the use of modern day technologies in even some of the remotest, rural and underdeveloped places on earth. Solar based energy generation, for that reason, has seen a dramatic increase in popularity. Many residential and industrial companies have invested in their own solar power generation to, among other benefits, help reduce cost and dependence or reliance solely on electric utility companies for its electricity. For the purpose of this patent, we are going to look at it from the perspective of integrating this UEI technology to broaden the choices associated with the power distribution channels. As such, the UEI platform will facilitate bypassing many of the problems already enumerated and show how this could be a platform providing a path towards energy conservation and independence.

Photovoltaic energy generation, which is the most widely used technology for power generation in solar panels, produces a DC voltage. Meanwhile, due to the adopted conventions, before its use, that voltage needs to be converted from DC to AC by means of power inverter units. That conversion takes place even in the case where the generated power is stored in large batteries prior to being used. As previously mentioned, most equipment in use, even when there is an AC plug coming directly from it, does have an internal power supply that converts the AC voltage back into DC. There again, that process has power loss associated with it.

One major aim of this invention is to seek to show how this Unifying Electrical Interface platform can be adapted to help benefit from power generated through DC supplies such as rooftop panels. Since this DC voltage does not have a long distance to travel before reaching its final destination, it can be regulated to be used directly with much of today's equipment. This near proximity or local generation of electricity negates the need to have AC as the only source of supply powering the entire home or business. In the case where the generated electricity is connected to the power grid, the operation of an alternate power generation system for AC is automatically suspended when there is an interruption external to the building. This is done to protect the service crew from being electrocuted by power originating from a building with independent energy generation. If some of the DC is channeled into a building, when the AC is interrupted, the building will retain a degree of electric power functionality.

With today's conventional standard in place, until such time where large capacity battery storage systems are perfected, made available to and is more readily accepted by the general public at affordable prices, it is still necessary to convert or invert all of the DC solar energy into AC. The power is fed into the supply grid to be used along with utility power station generated energy. The energy will be reclaimed at nightfall when the direct solar generation is no longer possible. That same buyback process is very useful during overcast days or in snowy regions where the production of electricity may be hindered. In instances such as those just enumerated, the conversion from DC to AC when the units are performing to their full or maximum potential, both the consumer who lacks storage capability and the power supplier benefit from the generated power mostly at times of high demand.

Another advantage made possible by the Unifying Electrical Interface (UEI) platform from this patent, is the provision to not only channel some of the alternately generated DC energy directly from the solar panels, or other sources, to the consumer but the ability to use this as a means of power conservation, while providing immunity in case of a natural disaster or any impact on the AC power grid either accidental or intentional. This method of using DC directly will bypass the back and forth conversion, —DC to AC and back to DC, —with all the loss associated with each step of the process. Use of this UEI connectivity and distribution platform will also, in the future, facilitate the manufacturing of equipment permitting them to be directly powered without the need for an internal AC to DC power supply conversion unit.

In some countries, for residential and some limited commercial use, the power lines entering the building is a Delta line, single phase 250 volts supply, having a center tap allowing to have two hot legs of 125 volts each with respect to the neutral point. If the standard is 125 volts, most equipment available for the market place are made to work with that available split voltage. Meanwhile, if the consumer owns equipment that only operate on 250V, the option to make use of it becomes very limited due to the lack of 250V hook-on outlets throughout the home. The capabilities of the UEI platform would help solve that problem in new construction or rehabilitation where the old system is replaced with new.

Going forward with today's existing distribution infrastructure, where a single option is delivered to an outlet port, presents the limiting factor in taking advantage of some of the higher voltage rated equipment. Making modifications to take advantage of such a higher voltage can be prohibitive due to the high cost of high power step-up transformers, or alternatively those associated in hiring a certified electrician to perform the conversion. That later cost of repair is at the root cause of some people choosing to live with a defective outlet that no longer offers a good mechanical and electrical connection for the plug connected to it. This poor contact may cause arching and could possibly be the cause of house fire or electrocution.

The ability to safely and easily install a hook-on outlet, that is intended to work with this UEI base interface, makes it possible for its final assembly to be performed without tools, by any responsible adult, provided they follow the instructions provided by the manufacturer. This effortlessness of installation makes it easy to replace hook-on outlets and switches as needed and for whatever purpose. In the future, the ease of alternating from one voltage level to another by just replacing the hook-on outlet illustrates another beneficial aspect enabled by the proposed platform. If equipment has a plug type G, as used in UK, there will be no need to modify the equipment by replacing the plug when all that is needed is to replace the hook-on outlet with the correct type for whatever country you are in, if the appropriate UEI wiring configuration is present. If the need is for DC, AC or any combination thereof, all the end user has to do is replace the hook-on outlet component with another one that will satisfy his or her needs.

The flexibility offered by the Unifying Electrical Interface platform is not limited only to hook-on outlets and supply types. The same platform with its ease of being user serviceable can be extended to switches as well. With this option, consumers will have a broad choice of replacing switches from one type to another as desired. That option is available and can safely be performed without the expense, inconvenience and disruption associated with the need to hire a professional electrician.

As already stated, the main aim of this invention is to leverage the versatility of the Unifying Electrical Interface (UEI) to extend the ease of adapting to different types of supplies and levels. Changing from AC 125V or 250V alternately as the need arises, or providing DC for various usages at different power levels, will be as simple as changing over to a new hook-on outlet if all of the UEI connectivity is already in place. This all can be achieved with the same confidence and effortlessness that exists today with inserting an AC plug into a wall outlet.

Of Significant mention is the UEI platform's flexibility to offer an avenue for energy conservation by eliminating loss due to power conversion and reducing the number of transformers left connected to the electrical supply source when not in use. Making use of this Unifying Electrical Interface (UEI) platform offers the possibility to expand the reach for greater DC use directly from the many power generation modes, such as solar, that are increasingly being made available to the general public. This would eliminate the need to first convert all of the DC power generated into AC to be sent to the outlets. From there to be used, that power will again be turned back into DC prior to being used by the power consuming device. It is very easy to see how this new platform can help in reducing the loss that is currently associated with the present platform, thus the path for energy conservation benefiting the environment and resulting in energy cost savings to the end user.

SUMMARY OF INVENTION

At the base of the UEI, when used as an hook-on outlet port, is a series of isolated and dedicated connection chambers forming a receptacle that can be wired in various modes to make it possible to get more than a singular supply type from that access point. Although late coming to the stage and was conceived with new construction in mind, this new platform, with minor modifications, is still possible to be made backward adaptable and compatible with older iterations of the current platform. Most houses have their infrastructure already built within the constraints of the preceding platform; it is nonetheless possible to upgrade the electrical system in a limited fashion to take advantage of the features and options made available by this proposed platform. Features ranging from making available a wide range of AC levels all via a singular port, or delivering DC or a combination of such types thereof.

In the case of extending the range from 125V single phase, hot leg to neutral, as used in the North American countries, the secondary hot leg of the opposing 125V will be brought to some desired locations where both of them can be connected to the platform. Areas such as kitchens, hallways and anywhere that this choice could be taken advantage of are likely candidates where it would make sense to invest into adding such an option.

For DC use, locations such as bedrooms, family rooms and offices—areas where many adapters/chargers are often used—having this connectivity in place can facilitate connecting directly into the DC supply, if available, to charge or operate the devices. A combination AC/DC hybrid hook-on outlet will offer even greater options and flexibility to the consumer. DC powered audio devices will have many advantages over the AC powered units. Benefits include size and weight reduction, minimizing heat generation, cost of manufacturing; and best of all, a cleaner sounding audio system.

To complete any given system will be some hook-on outlet units that can be plugged into the Unifying Electrical Interface platform to take advantage of the connectivity in place. The internal connection of those hook-on outlets and their active connection prongs will determine which of the voltages available at the UEI base will be made available to the consumer. If only a single phase 125V AC is wired to an interface, inserting a 250V hook-on outlet to it will not function properly or permissible due to the cross-insertion prevention key feature of the UEI platform. To facilitate in the identification of such UEI's thus preventing someone from inadvertently inserting a wrong component into a port, a matching keyed feature provision, mechanical, magnetic, jumpers or electronic such as RFID or optical such as Opto-Coupler, is built into both the UEI base platform and its intended hook-on outlet component unit to safely facilitate in this process. When properly implemented, cross-insertion of a component subset adapted for a Delta single phase 125V AC cannot be accidentally inserted into a UEI base platform intended for 250V AC, making the implementation of the system foolproof. The same can be said for preventing a switch or hook-on outlet component unit from being inadvertently connected to the inappropriate UEI base, thus protecting the consumer, the line and the associated device being connected. The same is true for both AC and DC.

Along with the benefit of switching between power level offered by the ease of replacing new hook-on outlets, comes the advantage of energy conservation offered by the UEI platform. When properly implemented, the benefit of not having a charger/transformer connected to the AC hook-on outlet which continuously consumes electricity, even when not in use, is thereby eliminated. DC coming either directly from a source such as solar power generation system, battery storage or simply from any DC supply source such as a gasoline, propane or natural gas generator, can thus be provided at the UEI base. A central DC source selector that will work in two modes, either from a pure DC source or from a converted AC source. A sensing circuit can help in preventing this home-based supply transformer from remaining connected to the AC grid until necessary. Alternatively, if the house is equipped with solar power and DC can be provided directly from the system, that circuit can automatically disconnect the power supply from the AC power grid and prevent unnecessary energy consumption when DC energy is not needed.

In the quest for energy independence, many sought to invest into alternative energy technologies. This approach, however, used with the current infrastructure does not offer an option to use the energy generated directly, which often is in the form of DC without first inverting it into AC. This is due to the lack of infrastructure and technology in place to take advantage of DC directly. By way of the UEI, the option is offered to have DC brought in directly to some hook-on outlet ports. As such, the need to have an AC only powered home is precluded. The option to have DC at the ports does not eliminate the choice of inverting the major portion of the generated DC into AC to place it back into the power grid in order to buy it back at nightfall.

In the case where the residence is located in a remote or rural location, the energy generated during the course of the day that cannot be used at the time of generation, or in the case where there is no power grid to place that power for reclaiming it at a later time, it is of great benefit to invest into battery storage. Battery technologies too have seen great improvements over the years. When they are approved and readily made available to the general public, the consumer will have a broader option to use AC and DC independently from having external power brought into the dwelling, thereby becoming fully independent.

Having the capability of battery storage working in conjunction with the UEI helps in many ways: It provides a path for the generated DC energy to be used directly without having to invert it into AC first. In the case where the house is connected to the power grid and all excess energy generation was placed into the grid, AC power generation is interrupted to prevent the line from remaining active and become a safety hazard to a repair crew when repairs are needed. Although that safety option should and will remain, in the case where the UEI is used the home does not go completely without power because of the DC side remaining active when such repairs to the grid are needed.

Same as is the case for hook-on outlets, the base of the UEI, when used as a switch port, is a series of isolated and dedicated connection chambers forming a receptacle that can be wired in various modes to make possible the selection of various type of switches or configuration from one or more such UEI. In this case as well, being late coming to the stage and conceived with new constructions in mind, this new switching platform, with minor modifications, is still possible to be made backward adaptable and compatible with older iterations of the current platform. Most houses have their infrastructure already built around the constraints of the preceding platform; it is nonetheless possible to upgrade them in a limited fashion to take advantage of the options made available by this proposed UEI platform. Options ranging from using toggle switches or replacing them with dimmers or whatever type desired is also made available by that platform. Switching types such as standard single pole single throw (SPST), dual SPST, 3-way and 4-way combinations can be accommodated by this platform. A matching keyed feature provision, mechanical, magnetic, jumpers or electronic such as RFID or optical such as Opto-Coupler, may be built into UEI bases and switch components to help prevent cross insertion of hook-on outlets into UEI switches and vice-versa.

They are classified as follows:
Component 110 which represents a residential or commercial VAC hook-on outlet connected from a Delta or a Wye supply grid.
Component 210 representing industrial VAC hook-on outlets connected from a Delta or a Wye supply grid.
Component 310 is a DC only hook-on outlet providing power via a USB or any other format.
Component 410 is a hybrid hook-on outlet that provides both AC and DC power.
Component 510 is a switch that could be a single or double gang or any other type.
Component 610 where a combination of power and/or signals could be sent to and from a unit.

Figure 3:
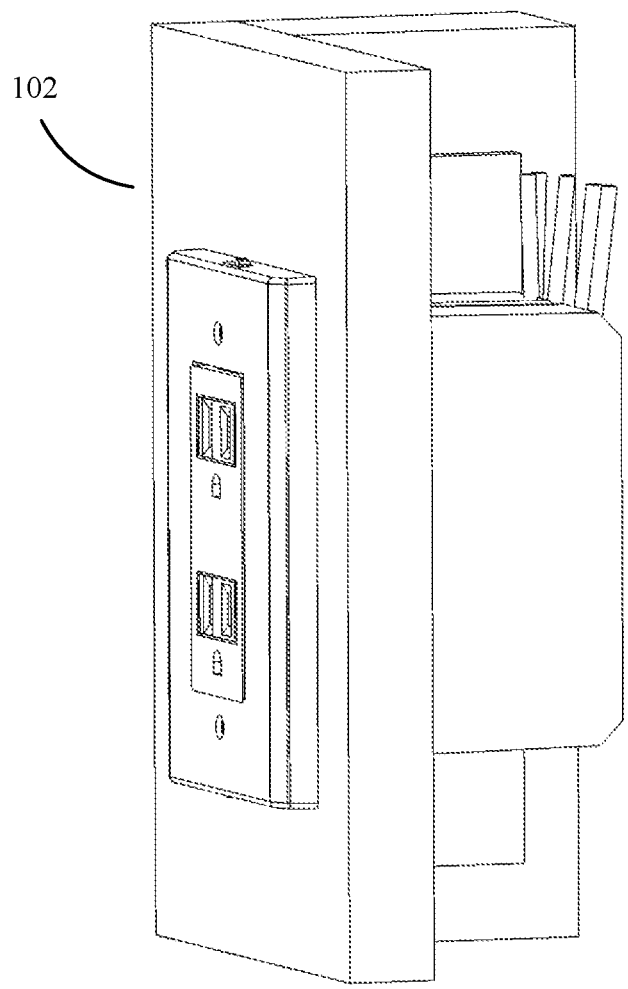

FIG. 3 represents a fully assembled 125 VAC hook-on outlet 102.

FIG. 4A is the representation of a power hook-on outlet 110 and some of its various components.

FIG. 4B shows the hook-on outlet 110 entering the UEI platform 10 as adapted for power distribution.

FIG. 4C is the representation of a switch 510 and some of its various components.

FIG. 4D shows the switch 510 entering the UEI platform 10 as adapted for switching control.

Figure 5:
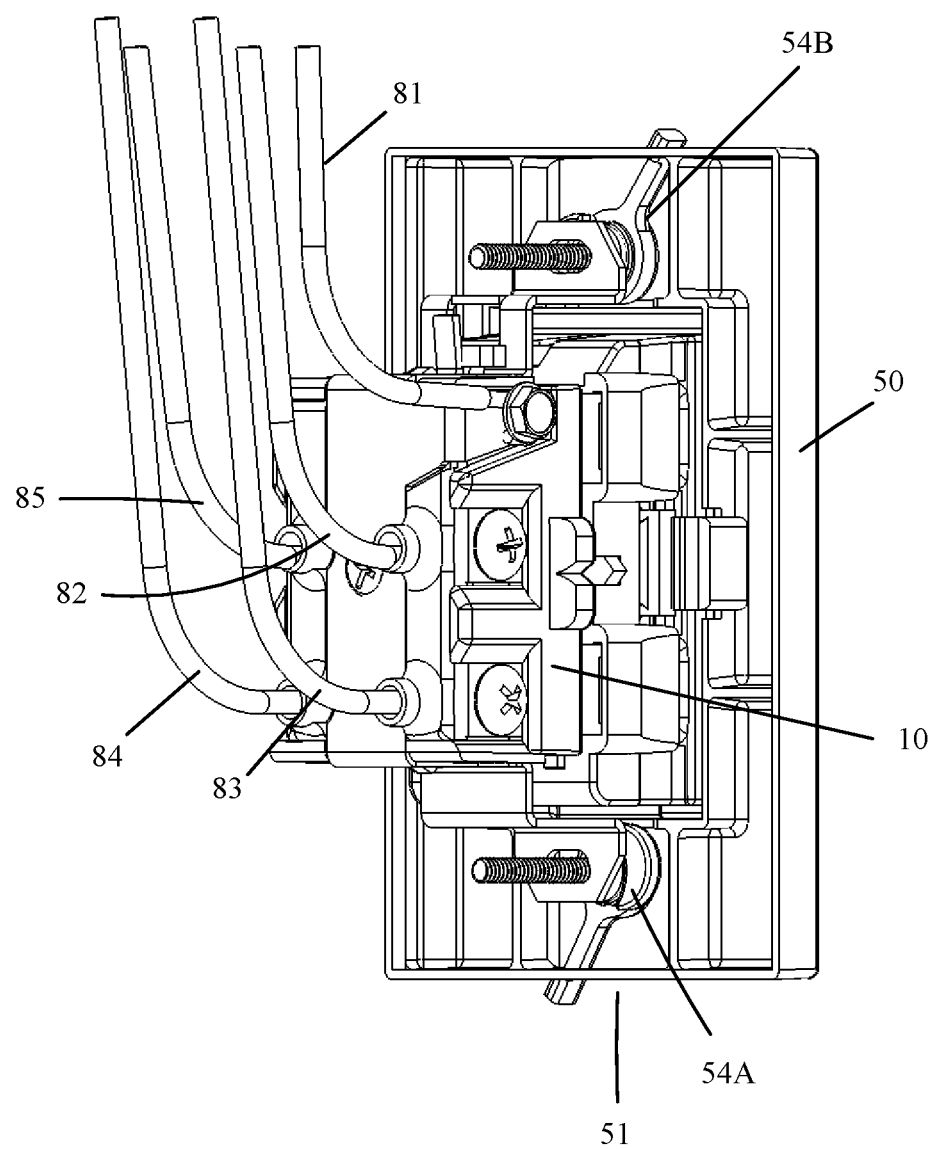

FIG. 5 shows the back view of a component fully inserted in a UEI 10.

Figure 6:
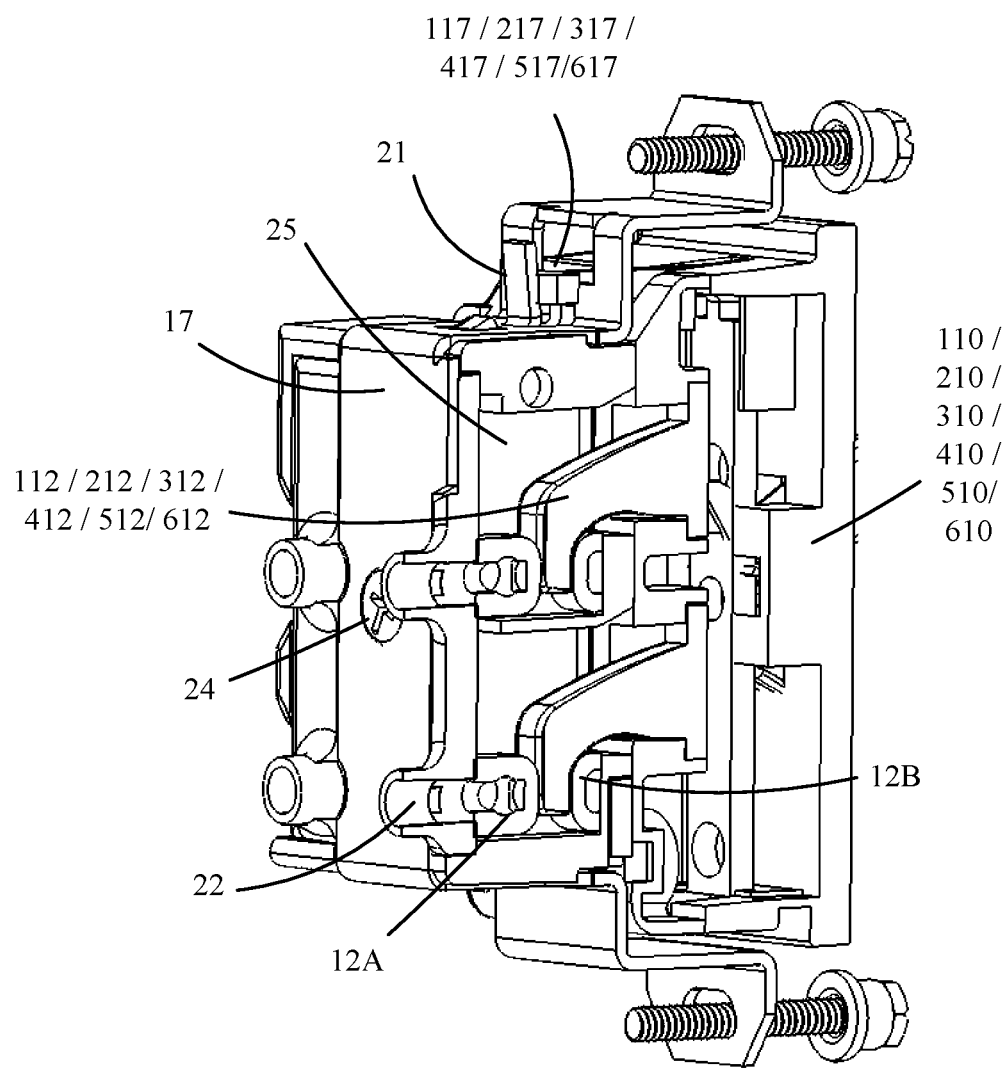

FIG. 6 is a cutaway view of a removable component and the UEI 10 to show the connection mechanism between the terminal lugs 12 with the terminal hooks 112, 212, 312, 412, 512 and 612 coming from the component.

FIG. 7A shows the mechanical key slots A, B, C and D used to configure a UEI 10 for a particular application.

FIG. 7B shows the corresponding mechanical key peg holes A, B, C, D, E and F used to configure a unit according to its type and function.

FIG. 7C shows the side view of a component highlighting the engagement mechanical key pegs.

FIG. 8 or Table 1 shows the mechanical key matrix used to protect from cross-inserting a wrong component into a UEI. The most common type of components and their descriptions are provided according to their application.

Figure 9:
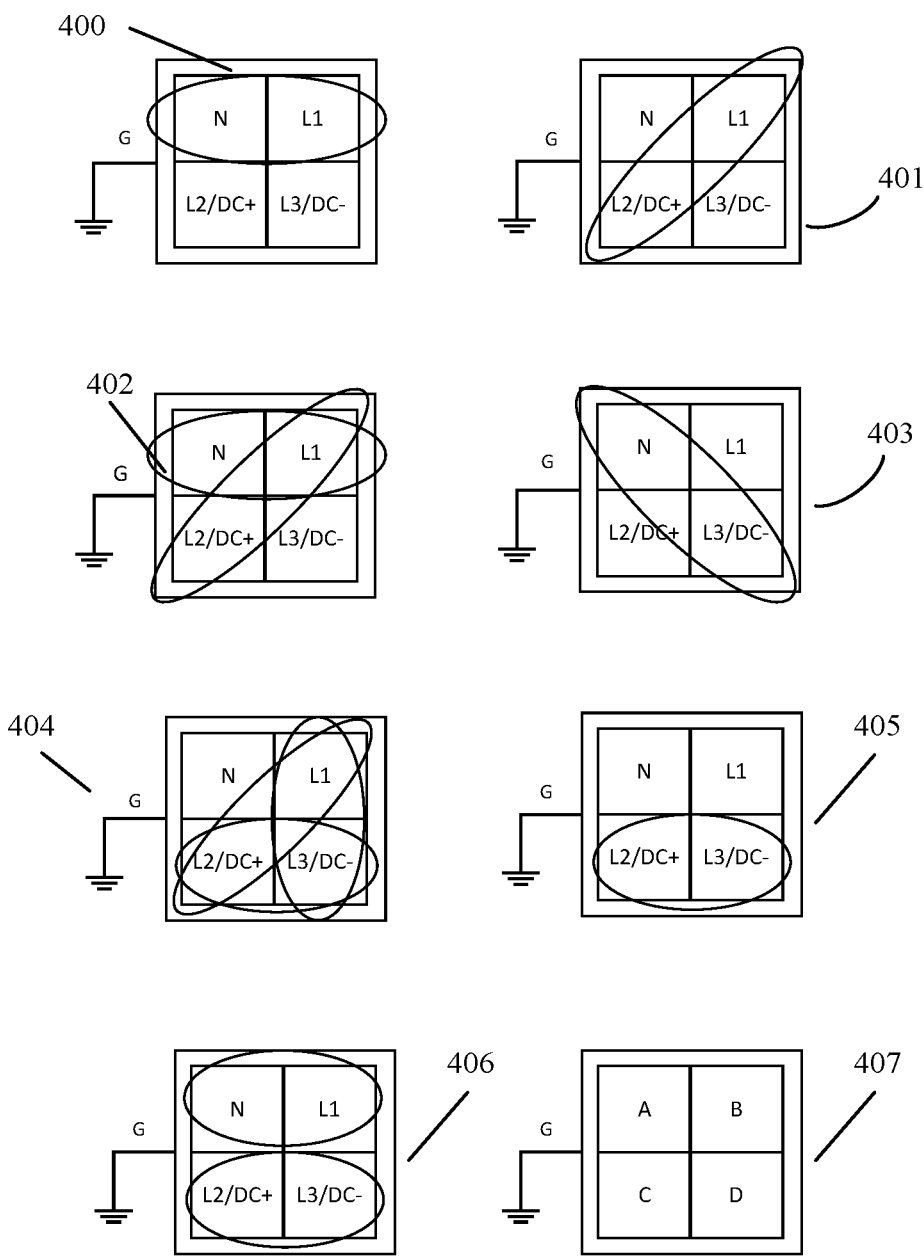

FIG. 9 illustrates a series of modes that the UEI can be wired to accommodate various hook-on outlet, switch and special components for various functions. The various modes will make available various voltages from diverse systems to the consumer.

In FIG. 10A is represented a sample of various outlet types and configurations 150. Although many more are currently in use, this sample is to show that a hook-on outlet can be of any type needed and still be able to take advantage of the UEI platform for the industry for which it is intended.

FIG. 10B is a hybrid representation of an hook-on outlet where both AC and DC 151 could be obtained, in this case with a series of USB ports.

FIG. 10C is a hook-on outlet where DC only 311 could be obtained, in this case with a series of USB ports.

FIG. 10D is an alternate hybrid representation of a hook-on outlet where both AC and DC 152 could be obtained, in this case with a cigarette lighter type capable of providing higher DC power output.

FIG. 10E is a hook-on outlet where DC only 312 could be obtained, in this case with cigarette lighter type ports.

Figure 11:
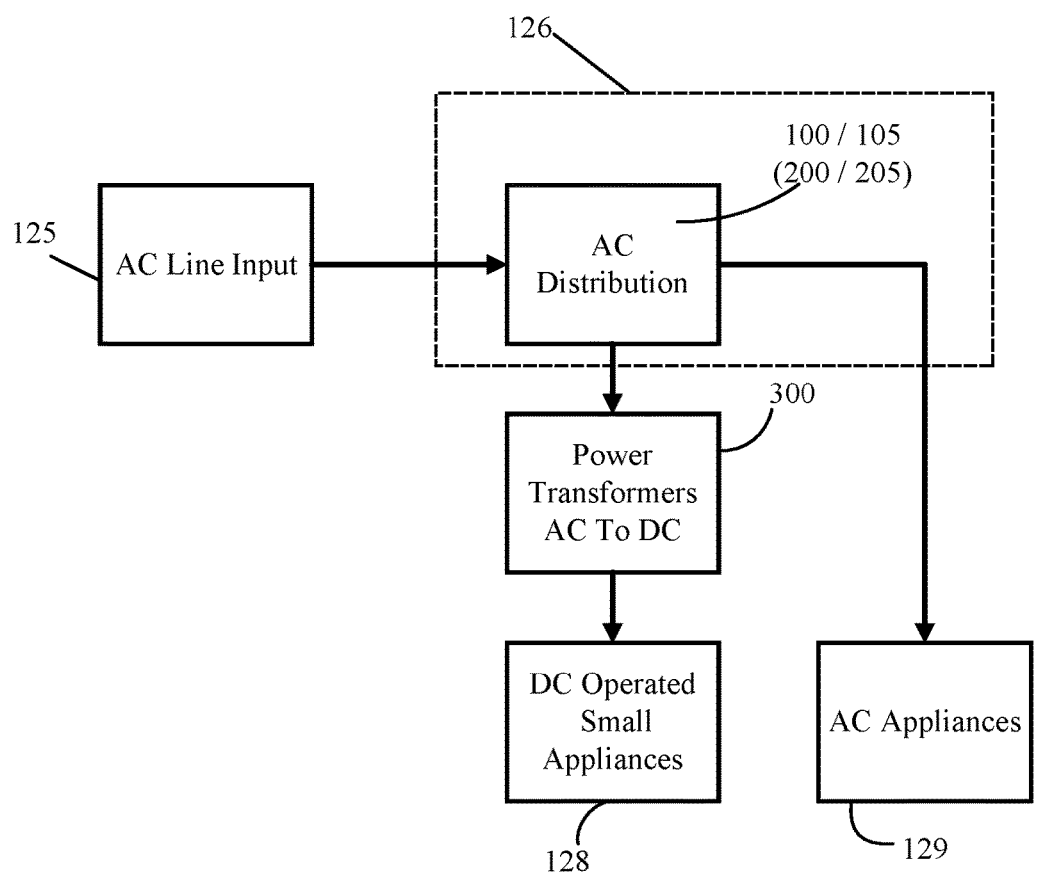

FIG. 11 is a basic block diagram representation of a typical AC line distribution 125 from the street to a circuit breaker 126, then, the present method of power usage is applied to either power an AC appliance 129 or a transformation and regulation 300 is used to convert the AC to DC prior to being used by small DC operated appliances 128.

Figure 12:
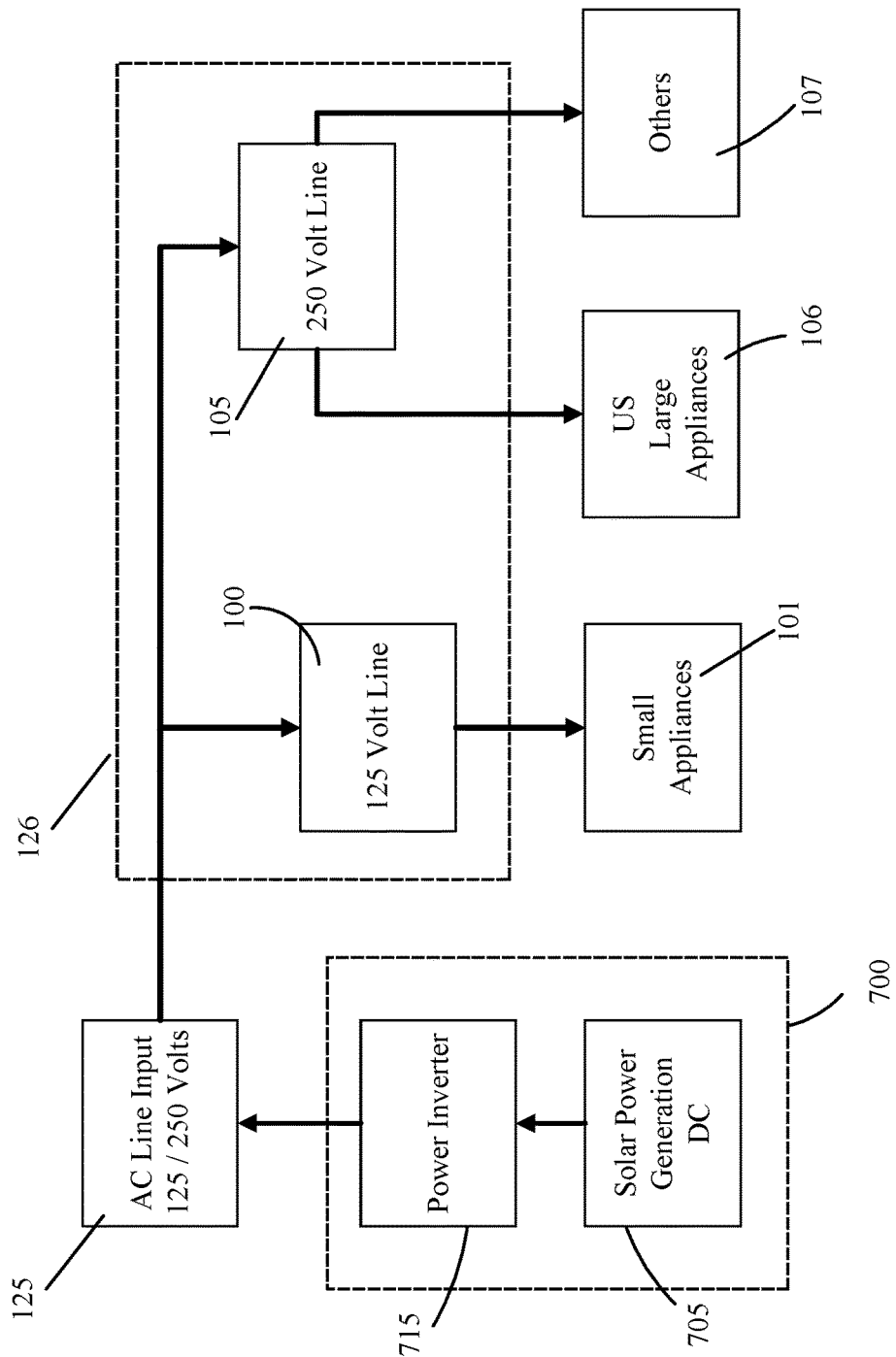
Figure 13:
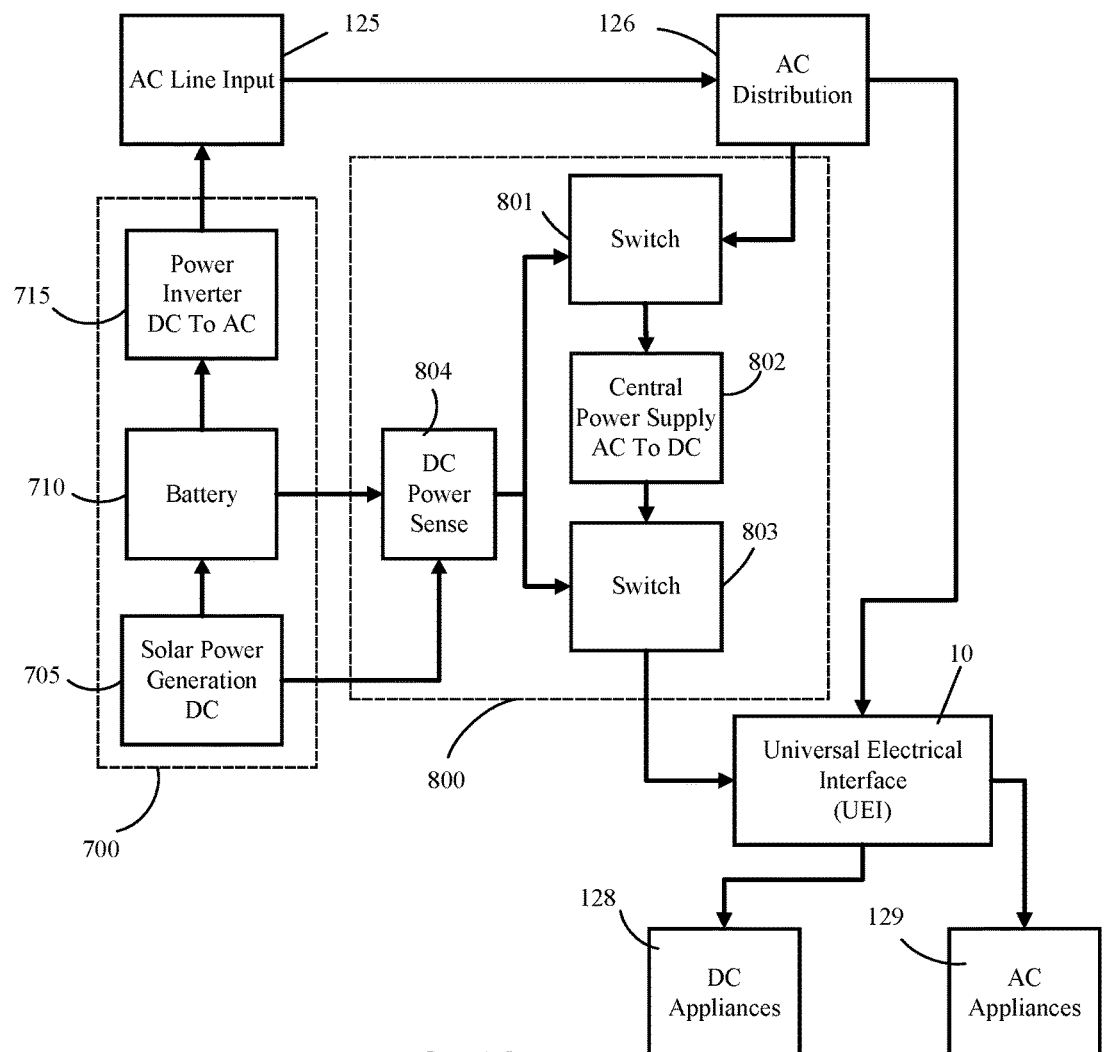

FIG. 12 highlights the alternate power generation system 700, in this case represented by a solar power system 705 and the inverter 715 required to convert the DC power produced by alternative renewable energy supply sources into AC. A large battery storage 710 can be placed in the path to store the generated energy for later use, as Illustrated in FIG. 13. Alternately, after inversion that AC voltage produced can be, in part, placed onto the grid before re-entering the home for later use in the absence of battery storage option. The power goes through a circuit breaker 126, then is subdivided as 100 for 125 volts family of appliances 101, also the 105 for 250 volts family of products 106 and 107 are represented.

FIG. 13 illustrates the system wide implementation needed to take full benefit of the Unifying Electrical Interface (UEI) in the power conservation mode.

While in some countries residential power needs can be generated from a single phase of the grid, industrial application is, however, more demanding particularly when very large motors are used and the efficiency of a 3-phase system is needed.

Figures 14A, 14B:
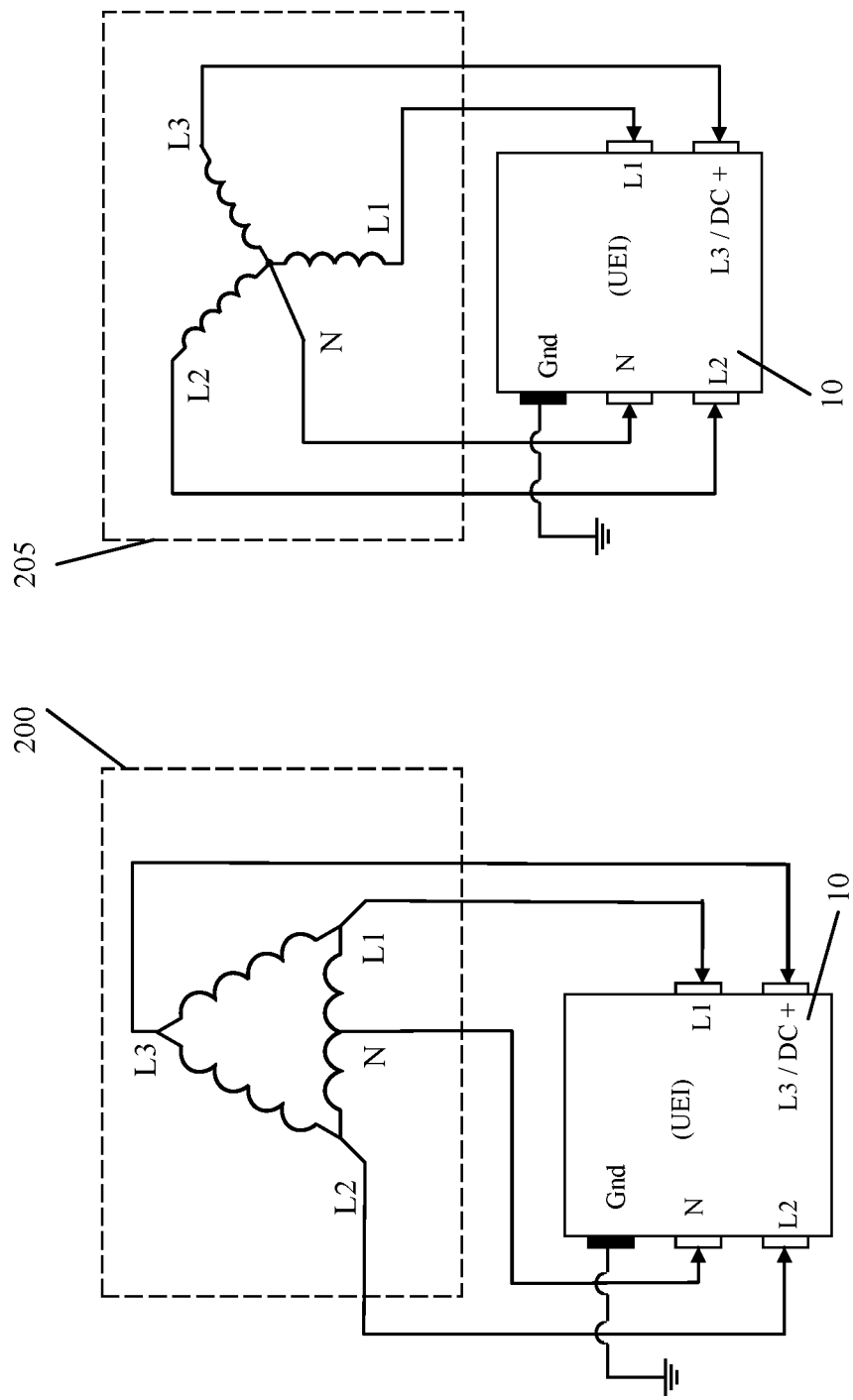

FIGS. 14A and 14B show how the UEI can be wired to the electrical supply source either from a Delta 200 or a Wye 205 line.

Figure 15A:
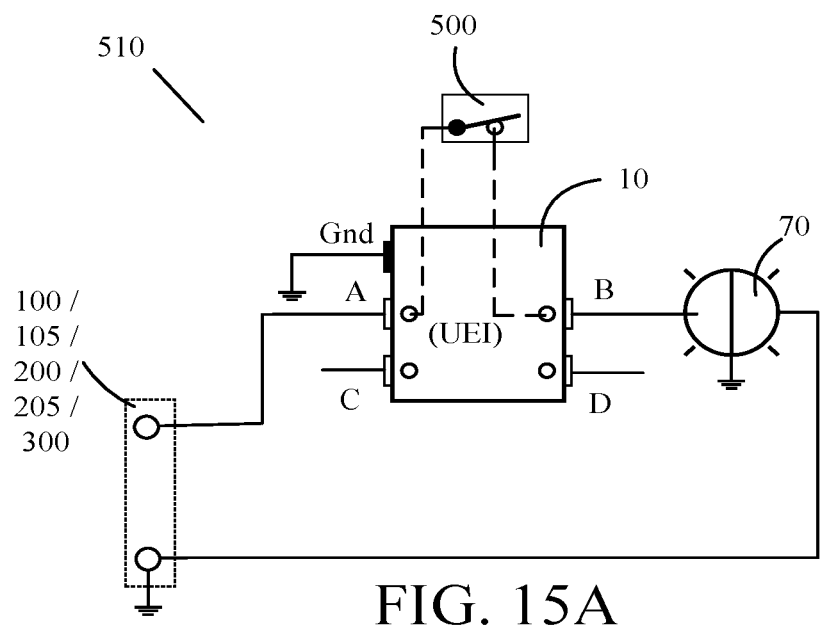

FIG. 15A represents the 510 platform, which denotes switching, connected to a standard switch 500 representing a single control element occupying the platform to control load(s) 70.

Figure 15B:
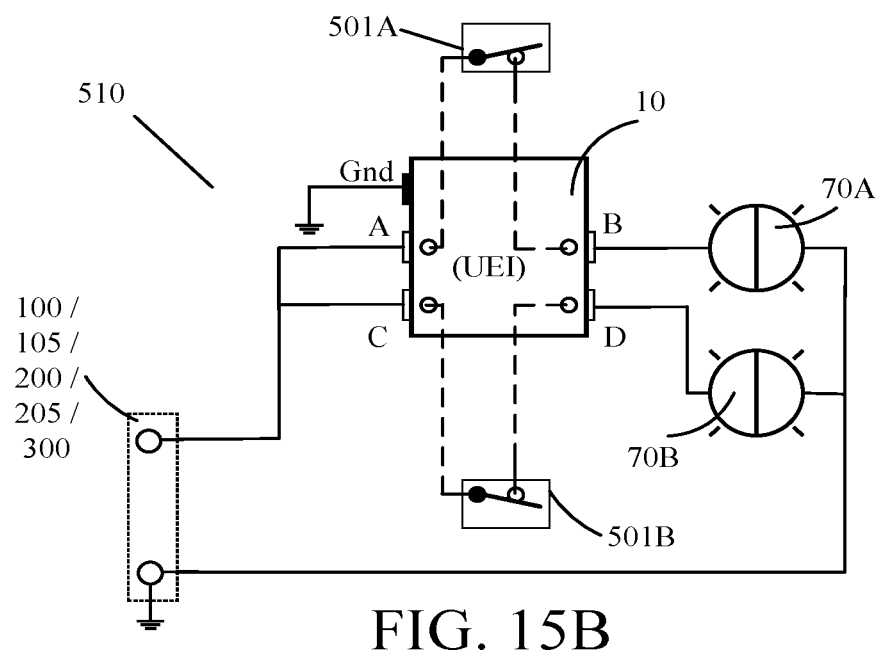

FIG. 15B in many ways is identical to 15A since they both make use of a single UEI platform 10. 15B differs from the 15A by the fact that it has a dual control 501A and 501B allowing it to switch two independent loads 70A and 70B.

Figure 16:
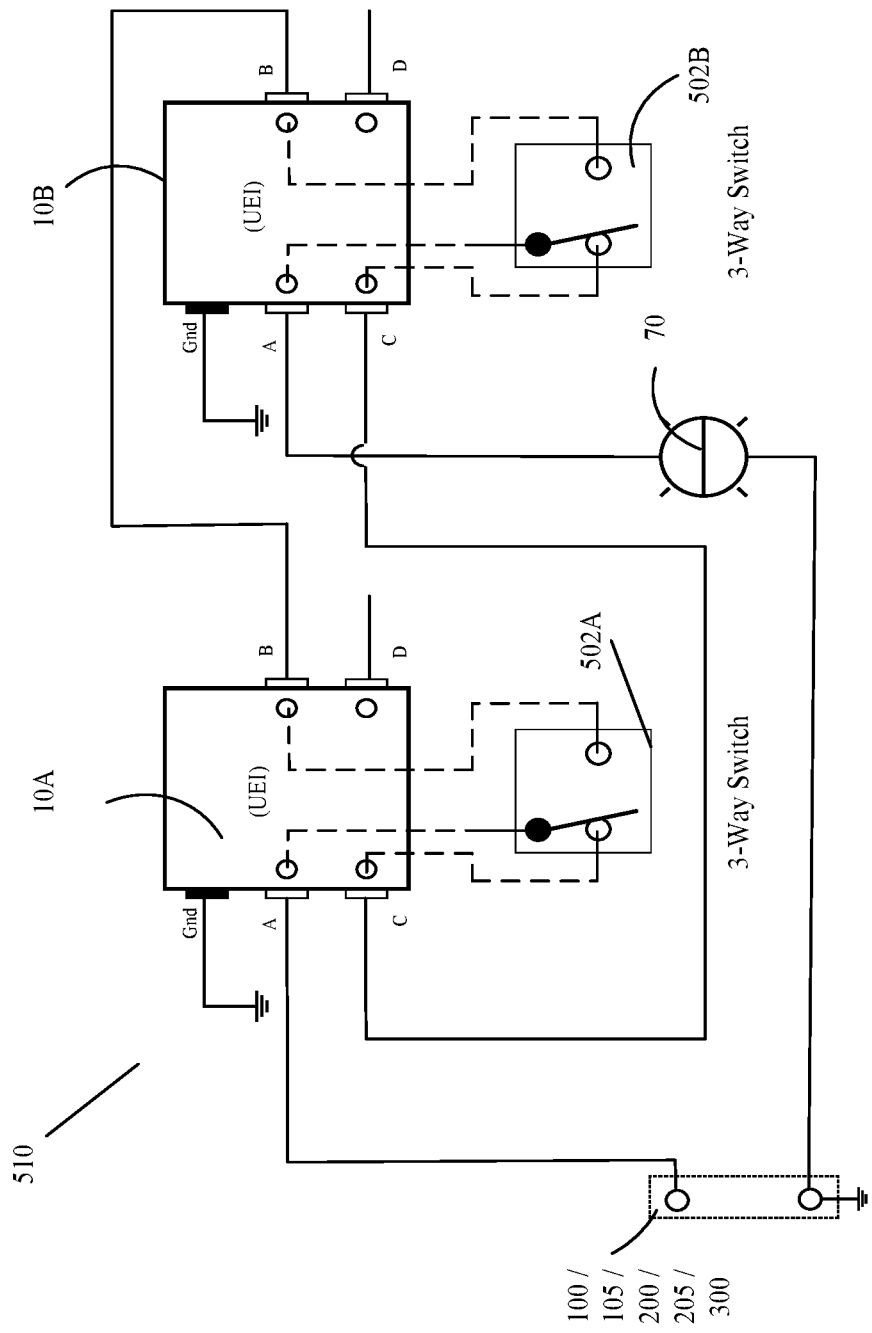

FIG. 16 is another representation of the 510 switching platform where two UEI's, 10A and 10B, are wired to accommodate connectivity between two 3-way switches, 502A and 502B. That mode of connection allows controlling a load 70, from two locations.

Figure 17:
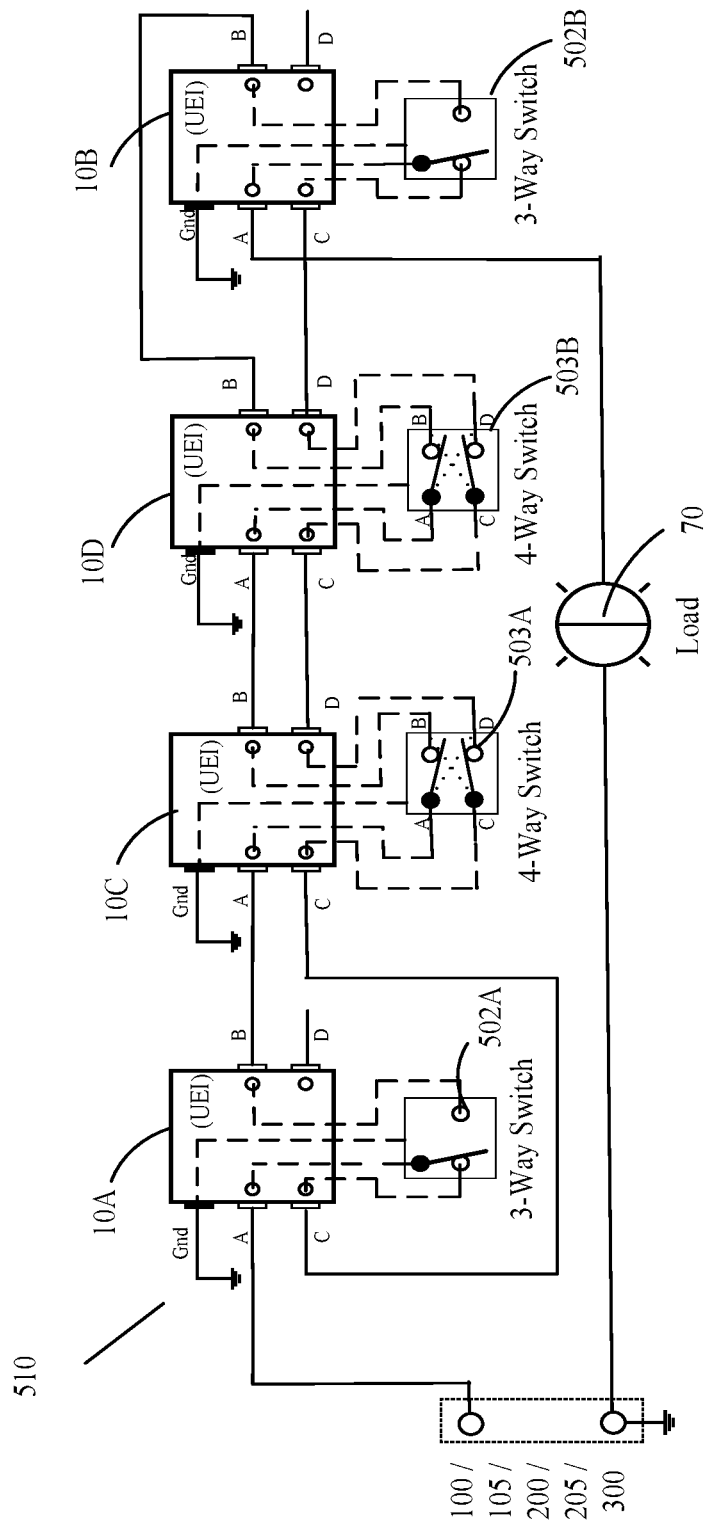

FIG. 17 is yet another representation of the 510 switching platform where four UEI's—10A, 10B, 10C and 10D—are wired to accommodate connectivity between two 3-way switches, 502A and 502B, and two 4-way switches, 503A and 503B. That mode of connection allows controlling a load 70, particularly a lighting fixture, from four different locations.

FIG. 18A is a representation of how the UEI platform 10 can be used in a 610 configuration to allow transfer of signals, in this case an amplified audio output, from one room to another. The normal 125V connection would be provided through a standard hook-on outlet to the unit and the amplified audio signal would be returned as Left and Right channels over the platform by way of a terminal strip 600 to be received in another room or a remote location.

By extension FIG. 18B is a similar representation of how the UEI platform 10 can be used in a 610 configuration to allow transfer of signals. In this case it can be data of any kind, for example a close circuit camera where video and audio can be channeled by way of terminal strip 600. This time it is represented as providing DC power to the unit but it can be AC as well.

DETAILED DESCRIPTION OF PREFERRED EMBODIMENTS

While connectivity to a power grid may take many forms, the adaptations found in this invention may be construed as one of many embodiments. Many similar approaches may be derived from this that will not be covered in this application but will, regardless, represent the intent of this patent to unify the world's electrical standards. The platform to be described in this preferred embodiment will exhibit many elements that when taken together will be found to be essential to explain the design intent.

At its base, the Unifying Electrical Interface (UEI) 10 takes the shape of a multi-channel hook-on outlet that provides pathways to either a single mode connectivity or a combination thereof. Instead of being a singular source of power, it will allow the choice for a wider selection of voltages and type while making it possible to conserve energy and reduce the cost of operation.

Figure 1:
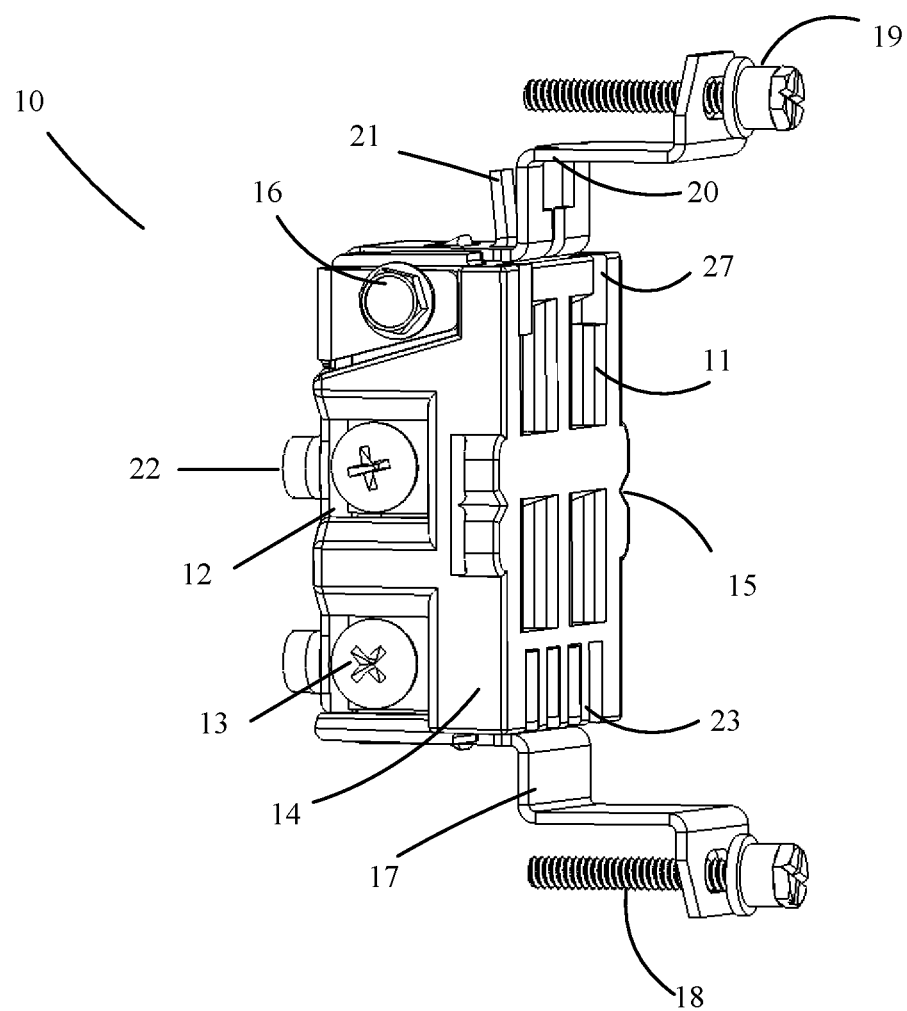
FIG. 1 is the basic unit forming the Unifying Electrical Interface platform. From there connectivity of various forms will be extended to the end user.

As illustrated in FIG. 1, the Unifying Electrical Interface (UEI) 10, the basic platform at the core of this invention, is shown with its various elements. At present, it offers four entry holes 11 that have four terminal lugs 12 encapsulated in housings 14. That number of pins and terminal lugs can be increased or decreased as needed, and either can be made of conductive materials, if they are to provide mechanical as well as electrical functions. Alternately, they can be made of plastic if their sole function is mechanical. The conductive terminal lugs are to be made of a material such as copper. Each of the conductive terminal lugs 12 are to be designated paths to an electrical leg of the electricity to be channeled through the interface. Mating hook-on outlets or switches, as shown in FIG. 2 and FIGS. 4A, 4B, 4C and 4D, components 110 and 510 have a set of four contact pins with a hook that protrudes into the four entry holes 11. From there, they can, with a slight downward push of the component unit, be caused to securely mate with the four terminal lugs 12. That mating secures the electrical connection while introducing a mechanical engagement between an outlet, a switch or any such cartridge or module device as may be designed to interface with the the UEI base.

FIG. 6 is a cutaway view of a removable unit either 110, 210, 310, 410, 510 or 610—which differentiations were detailed earlier, and the UEI 10 platform to show the connection mechanism between the terminal lugs 12 with their connection channels formed by the legs 12A and 12B offering a displacement mechanism where hooks either 112, 212, 312, 412, 512 or 612—coming from a removable component are shown to be engaged. The terminal lugs 12 reside each in its respective isolated chamber 25. Chambers 25 provide isolated enclosures for each supply legs to form safe electrical connectivity environment between the various branches of the supply lines. Grounding prongs 117, 217, 317, 417, 517 or 617 are also shown engaging the wedge 21 of the retaining bracket 17 where both mechanical and electrical connections are made.

This platform allows for multiple type of connections to be made such as hook-on outlets of various forms, switches of various types and even extends the ability to channel data. Due to that fact, it has become necessary to prevent components of a different subset to be inserted into another type.

To remedy against such mishaps, a combination of either, mechanical, magnetic, jumpers or electronic such as RFID or optical such as Opto-Coupler provision "key" feature are applied to both the UEI and the component to be mated to it that will prevent cross-insertion of units and UEI's. FIG. 7A shows the implementation of a mechanical "key" feature at the base of the UEI where some channels 23 D, C, B and A, when facing the UEI, are available to either allow a component with an identical access peg 124 or one of the same family to be plugged into the UEI base or prevent access to it by means of some "key" pegs.

The component either a switch or an hook-on outlet is equipped with the same mechanical key feature FIG. 7B. A view from the back reveals the keys labeled as A, B, C and D into which a combination of key pegs 124, 224, 324, 424, 524 or 624 are inserted to match the UEI a component is intended for. In the case of mechanical keys, if the combination does not match, the mating will not take place and the insertion will be prevented. Table 1 illustrate some of the key combinations and their application.

When used to channel AC, the possibility does exist that the electrical supply source could be either a Delta or a Wye type. With that differentiation, the voltages that could be obtained at the terminals of the UEI will be very different. There again, to prevent cross-insertion of hook-on outlets to the wrong platform configuration a set of mechanical mode keys 27E and 27F are added at the top of the UEI where the requirement to have the correct hook-on outlet with its respective 127E or 127F, in the case of a residential hook-on outlet, to match that base will be necessary to avoid delivering the wrong voltage to an equipment. When channel E of the UEI is active, denoting a Delta line, the units that will be accepted by that UEI must have a single corresponding peg 130E inserted into channel 127E of the hook-on outlet to mate and access that base. If the peg happens to be an F or both, access to that UEI would be restricted. The various configurations are illustrated in Table 1. Mode keys E, F or both need to always be present from a component to be mated to the UEI, based on its function, otherwise the risk of cross-insertion will not be averted.

The retaining bracket 17 keeps the UEI assembly together and allows it to be secured to the electrical hook-on outlet box by way of installation screws 18 located at both end of the retaining bracket. The interface assembly is secured to the retaining bracket by way of a screw or a rivet 24, located in the back of the interface. The retaining bracket is also grounded through connection made by way of screw 16. Shoulder shoulder washers 19 of screws 18 are to allow the Faceplate cover to be centered and secured in place without the need of a screwdriver.

Engagement Screws 13 of FIG. 1 or [entry ports] by way of the cover plate and its electrical access holes 22 of FIG. 6 are alternate ways electrical connections can be made with the system. Terminal lugs 12 will be energized and will transfer the connectivity to hooks 112, as in the case of a residential hook-on outlet or switch, as can be seen in FIG. 6. In the retaining bracket 17, grounding prong insertion cavity 20 and wedge 21 are formed to guide the mating assembly. After full insertion of a hook-on outlet or switch, grounding hook or grounding prong 117, in the case of a residential hook-on outlet, engages grounding prong insertion cavity 20 and the interference presented by the wedge 21 and the guide pin 117 from the component to be mated provides electrical grounding for the hook-on outlet or the switch. Insertion guides 15 located on either side of the interface enclosure 14 serve the purpose of confirming the insertion of the interface with the mating hook-on outlet or switch. When the units are fully mated, the insertion guides 15 on the sides of the interface line up with the arrows 115 of the mating unit. Also the sides of the insertion guides number 15 serve to limit the lateral movement that this hook-on outlet or cartridge can take to prevent the electrically charged screws from touching adjacent wires or other interfaces.

The proposed UEI base 10 is envisioned to be a permanently mounted low profile hook-on outlet that can be inserted inside a deep profile electrical box 60 leaving sufficient room for the electrical wiring of the UEI. The frontal space, after installing the UEI base, is sufficient to allow the intended hook-on outlet 110, in the case of a residential unit, to be inserted by approximately 0.5 inch (13 mm) into the electrical box without protruding excessively outside of the wall. If a low profile electrical box was to be used instead, it would require a different retrofit bracket permitting the UEI platform to stick out more from the box in order to create sufficient room for wiring the unit. The choice to change to a deep box or having the assembly protruded outside the wall a bit more than the standard is left to the end user.

The choice just described highlights the fact that it is cosmetically more appealing to adapt this platform to new constructions, thus taking advantage of using only deep electrical boxes. It remains that for some older construction, someone may elect to upgrade their electrical boxes to take full advantage of this platform without losing on the cosmetic aesthetics. Regardless, the option for a retrofit unit would be made available for those who would prefer the functions and flexibility of this system over cosmetics without undergoing extensive changes to their house or building.

Mating components to the UEI as represented in FIGS. 4A-4D have four clearly shown prongs 112, as in the case for a residential hook-on outlet, where connections can be made. They are built with a footprint that matches that of the UEI and allow for perfect mating of the units to the UEI base platform. Each hook-on mating component is also equipped with a dual purpose prong 117, 217, 317, 417, 517 or 617 that not only serves to mechanically secure the said component to the assembly, limit its lateral displacement with respect to the UEI base 10, but also establishes the electrical connection needed for grounding the system. The electrical paths from a hook-on outlet or switch component to the UEI are made via prongs coming from the mating component having hook-liked shapes 112, 212, 312, 412, 512 or 612 that serve in securing a particular unit from being pulled out of a wall.

Figure 2:
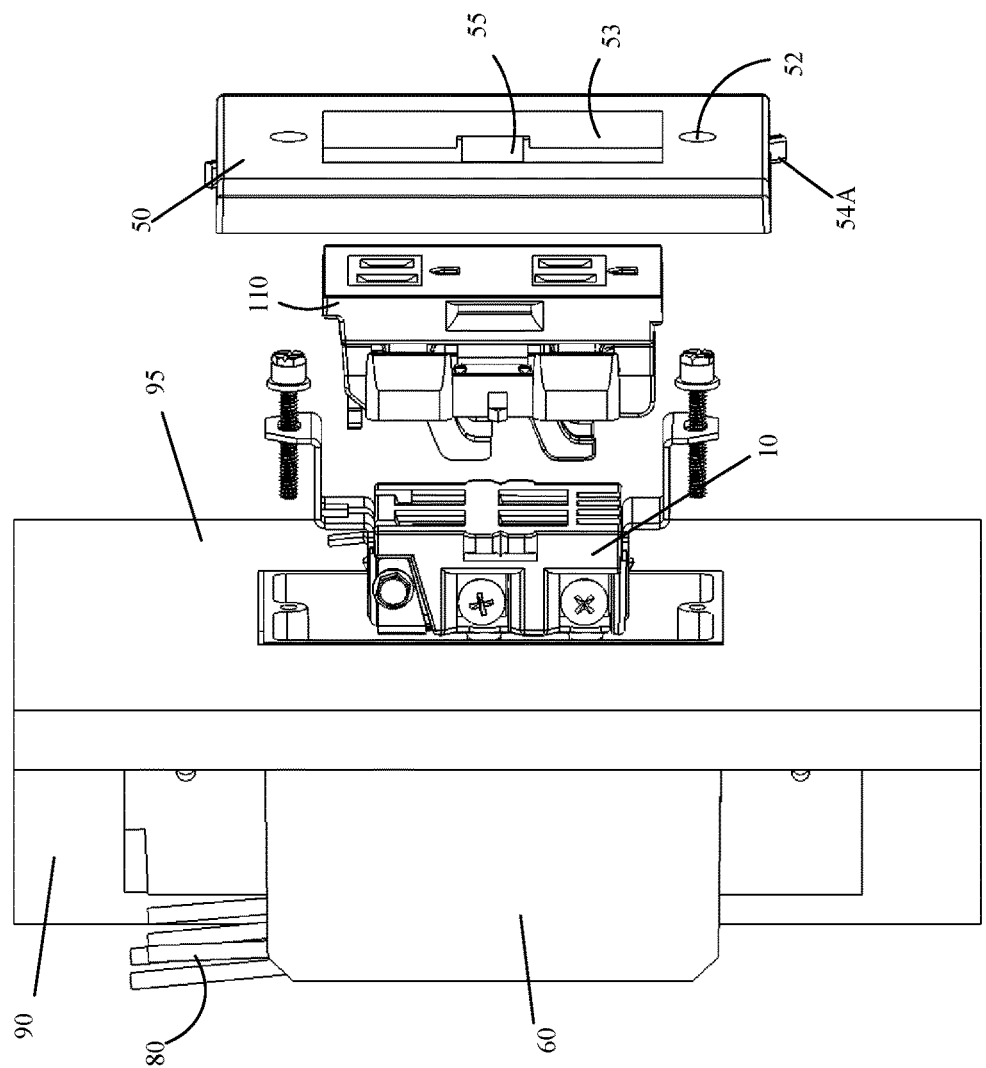
FIG. 2 is an exploded view of a hook-on outlet component and the Unifying Electrical Interface platform and its assembly. In lieu of hook-on outlet 110, alternate components could be installed.

In FIG. 2, an exploded view describing the makeup of this system is represented. There wall-stud 90 and sheetrock 95 are shown to include an electrical box 60 and wires 80. In the exploded portion of this view, the Unifying Electrical Interface (UEI) 10 is shown as the next element going inside the electrical box 60. The 125V hook-on outlet 110 follows in the assembly of the system. Finally, the Faceplate 50 will complete the system. Cartridge opening 53 of the Faceplate allows the cartridge in use to go through the Faceplate exposing its features either outlet contacts, switch control or both. Next to the cartridge opening of the Faceplate is found a set of centering holes 52, located one on each end allowing the Faceplate to be located over the UEI's installation screws 18 and the shoulder washers 19 shown in FIG. 1. By means of this assembly system, the Faceplate is centered about said cartridge securing its engagement onto the UEI base to maintain mechanical and electrical connections. Latches 54A and 54B from the Faceplate will be used for locking the whole assembly into place. That latching mechanism prevents the unit from moving away from its locked position. Engagement tabs 55 from the Faceplate are intended to engage recessed feature 118 of hook-on outlet or other components to align in the insertion of the Faceplate. That same feature with its spring action makes the Faceplate a bit harder to be removed, as would be needed if the unit was to be tempered with by underage children. All this can be achieved without the need for any tools.

FIG. 5 is shown to represent a unit fully inserted in UEI 10. In that representation, the electrical cover plate 50 and its locking mechanism 54A and 54B are shown centered around and about the shoulder washers 19 and engaging the edges of the removable component to lock the whole system in place. The back view also shows the electrical wiring of the UEI where the wires 82, 83, 84 and 85 are shown inside their respective port 22 seen in FIG. 1, From there, they will make contact with their respective terminal lug 12 located in each respective isolation chamber 25. Alternatively, the wires could be attached directly under the screws if so choosing. The grounding wire 81 is also represented connected to the retaining bracket.

Unlike most other approaches who use the conventional faceplates for outlets or switches respectively, this new system uses a proprietary Alignment Faceplate which is an integral part of the system. The Alignment Faceplate not only fills the decorative and insulating function for the consumer, it also serves as an engagement unit guaranteeing a perfect electrical connectivity of a given component to its UEI platform. It comes with the added advantage of ease of installation that does not require any tools. It is nonetheless built in such a way that it will provide a measure of difficulty to easily be removed by small children as explained earlier.

As previously stated, the main intent for this patent is to provide a platform for unifying the various AC electricity standards that are presently in use. It also will extend the advantage for being an avenue to make DC, either obtained from battery storage or green power generation systems, available directly to the consumer without having the need to produce it from AC at the final stage. As a result, when reference is made regarding DC voltage to be received at the terminal of the UEI, it is not implying the common method of converting AC into DC as found in many hook-on outlets sold today. The DC in question could, as just described, originate directly from any of the renewable energy technology method of power generation or from a battery storage.

Table 1 of FIG. 8 highlights the steps taken to prevent cross-insertion of units into a UEI wired for another intended purpose. The prevention measures are in two steps, a set of mode keys and another set of function keys the two forming a cross-insertion prevention key feature. The function keys are labeled A, B, C and D with A being the least significant bit (LSB). The mode keys are labeled E and F. An active E implies an AC Delta system or an F for a Wye system. A bit value of zero in the case of the UEI implies a closed cavity. No pegs would be able to engage the UEI thus restricting access to it. A bit value of one, implies that the cavity is open to allow a "Key" peg from a modular cartridge to engage the UEI and allows it to be connected to the UEI base.

A mirror image convention is employed from the UEI base keys to those of the hook-on component to be mated to it. A bit value of zero at a component base implies the absence of a peg. A bit value of one denotes the presence of a peg. The same convention is applied where its feature is identified with keys labeled A, B, C and D in reverse order. The A bit is also the LSB of the group.

The key features and modes found at the UEI and the component bases were designed with the intent on granting or restricting access to a given component to be mated to the UEI set for a particular purpose. A UEI platform has the capability to be wired in different modes to make the various options accessible to the consumer. For that purpose, FIG. 9 illustrates some of the modes that this platform can be electrically wired into for making available to the consumer several voltages AC and/or DC at various level. As previously explained, a mechanical "key" mode 27E and 27F are also provided to differentiate between AC coming from a Delta or a Wye system. Connections from the two grid supply modes can reveal different output level.

When wired from a Delta system, having key 27E active, the mode 400 of FIG. 9, showing a connection between L1 or L2 and N from the breaker box, represents the standard North American L1 or L2 to N where half a system voltage representing a level such as 125V AC can be made available to the consumer. For load balancing the hot lines, L1 or L2 may end up being connected to the L1 terminal of the UEI. The electrical panel design will account for swapping the phases to maintain a balanced system. The feature key associated with that mode will be a Binary code 0001. With position A from the UEI being the least significant bit.

When wired from a Wye system and having a mode key 27F active, the mode 400 of FIG. 9 produces a phase voltage for that assembly. For load balancing, the electrical panel design will account for swapping the phases to maintain a balanced system. The feature key associated with this mode is also a Binary code of 0001. The differentiation between the two modes is made with the E and F options.

In mode 401 of FIG. 9, showing a connection between L1 and L2, is represented the connection mode to obtain a full Delta system phase-to-phase voltage. In most North American residential and commercial usages, the voltage level is around 250V. In other countries where the supply level is the full phase-to-phase with no center tap, the UEI would be wired in a fashion to make available the full system voltage to the consumer. The access code for this function is a Binary 0010 and a mode key having the 27E channel active.

In Mode 401 of FIG. 9, when connected to a Wye grid, it will deliver a voltage level equal to the phase voltage multiplied by 1.732 or Square Root of 3. The access code for that function is also a Binary 0010 and a mode key having the 27F key active.

Since all voltages at the terminals of the UEI do not need to be distributed to a hook-on outlet, using a Binary feature key code of 0011, an all-purpose AC key is defined. All available AC combinations found in a system can be accessed via that key and the configuration of the hook-on outlet component's active hooks. The various combinations are illustrated in modes 402, 403 and 404 of FIG. 9. Many configurations and voltages levels can be obtained depending upon which mode key is selected. Connections between L1-L2 offers a phase-to-phase voltage coming from a Delta or a Wye system. Connection between L1-N offers the option of obtaining ½ a system voltage from a Delta system and a phase voltage from a Wye system. Connection N—L3, commonly identified as a high-leg voltage from a Delta system where a voltage representing ½ the system voltage multiplied by the square root of 3 or 1.732 can be obtained. Also phase voltages can be obtained from the neutral point N to any of the legs L1, L2 or L3 in the case of a Wye system. Lastly system voltages of L1 to L2, L2 to L3 and L3 to L1 in the case of a 3-phase system either represented by a Delta or a Wye system can be obtained. The differentiation for this configuration depends on the mode keys where an E would be made active for a Delta line and an F for a Wye line.

In mode 405 of FIG. 9 is represented the connection for DC delivery. The level could be set to be of a voltage ranging from 75V to over 100V capable of delivering a current up to, for example, 10 to 20 Amperes for that line. The power level to be delivered to the consumer can be adjusted at the hook-on outlet or cartridge where depending on its type and desired voltage the power output can be regulated. The feature key associated with that mode is a Binary code of 0100. The mode key is set to have both keys E and F active. A central DC source selector for DC power distribution or access point 800 intended to select DC source origin to the UEI platform is represented in FIG. 13. Instead of converting AC into DC at the hook-on outlets, DC is rather channeled directly from solar panels 705, from a battery storage 710, if available, or a central power supply 802, to hook-on outlets via the UEI. The AC path to the UEI is also represented. The combination of the alternate power generation system 700 and the DC source selector 800 create a self-contained home grid where DC power to be used in a dwelling, delivered at the UEI base, is switched by way of relays 801 and 803 to be completely sequestered from the AC power grid.

In mode 406 of FIG. 9 is a hybrid configuration where both AC and DC can be obtained. The feature key in this case is represented as 0101 for a hybrid combination of 125V AC also having a DC output. The mode key in that case calls for either E or F to be active depending on the AC grid type in question.

In mode 407 of FIG. 9 is a free representation of how the UEI can be wired for either switches or other special options. Table 1 illustrates the various feature codes that can be used depending on the desired application. Whereas the mode keys for all the options mentioned are set to have both modes E and F active. In the case where the UEI is to be adapted for switching, FIGS. 15 to 17 illustrates the various combinations that could be obtained and their wiring possibilities.

FIGS. 11 and 12 encompass the various aspects of the preceding platform, its mode of power delivery, the conversion needed to move from AC to DC and the various problems encountered when trying to adapt to the variety of outlet standards used throughout the world. They also illustrate the case that is being made here that there is waste associated with the many conversion steps to be taken to change DC to AC and back to DC before being used. The limitation to a singular voltage at the base of a hook-on outlet can also be derived from the block diagrams here represented.

For the purpose of this patent, FIG. 13 illustrates how all power systems AC and DC can be channeled to arrive at a unifying delivery base as represented by the Unifying Electrical Interface (UEI) platform. From there a multiplicity of voltages and/or formats are made available and a singular voltage can be selected from the group to satisfy the need of a consumer. The system is illustrated in block diagram format, the type of implementation needed to take full benefit of the Unifying Electrical Interface (UEI) platform and its system of connectivity. To improve on energy conservation and curtailing the consequences otherwise, the new platform for power distribution will make it possible to bring in DC supply directly to the hook-on outlets, bypassing the need of multiple transformation steps from DC to AC and back to DC before the DC generated power source can be used.

DC Power generation 700 which could either be derived from solar power, battery array, or any other method, always generates DC which then is converted to AC before being used. This platform makes it possible to use some of that DC directly for many applications around a house or building. Also introduced in these diagrams is a secondary method intended on keeping the DC port functional even when alternate DC power generation supply source has dwindled; the DC Transformer 802 is illustrated to show the use of power from the grid to generate DC to keep the ports active. The benefit of this single point supply source is to alleviate the need to have multiple small transformers scattered throughout a building to generate their own DC, resulting in a single transformer connected to the power grid to provide the DC voltage needed. It can also be automatically disconnected from the grid when no power is being drawn from the system. This will contribute to maintaining the energy conservation objective of this patent.

As previously mentioned, the UEI platform was initially intended for providing multiple power options through a single delivery port. However, it is also a versatile unit that can be adapted for signal interconnections. Alternate embodiments of this invention take advantage of the flexibility and versatility of the UEI platform to adapt it for switching and data transmission, as illustrated in FIGS. 15 through 18.

Many more technological applications may benefit from the UEI platform such as "smart grid" technology, Internet of Things (IOT), may arise from or be utilized by this Unifying Electrical Interface Platform technology and are not represented in this patent application but do remain the intent of this invention. Anyone skilled in the art may easily discern these and/or other aspects not described herein but, do remain and constitute the intent of this patent.

The invention claimed is:

1. A Unifying Electrical Interface (UEI) as an intermediate power delivery and connectivity unit forming a distribution platform configured to connect a plurality of power sources and to provide a range of AC and DC voltages simultaneously and is adaptable to worldwide power connectivity standards, comprising:

a UEI base as a fixed bus line female connector having a plurality of independent isolation chambers, said UEI base channels electricity from an electrical power source such as an AC electrical power grid by way of a power distribution panel or breaker box via electrical conductors to a modular power control and connectivity means, said UEI base is constructed with an insulating material to isolate the various individual electrical conductors from each other while permitting access to only intended electrical connection to be safely established to the UEI base;

a modular hook-on outlet, a switch or other device types as the cartridge intended for power connectivity or control, said cartridge can be swiftly connected to the UEI base by way of terminal hooks, said cartridge can be any device type as used worldwide;

a series of two or more terminal lugs housed within the isolation chambers located inside the UEI base, said terminal lugs are constructed of conductive material such as copper, brass or similar material;

a rear cover plate having a series of electrical access holes, said cover plate is made of an insulating material, wherein electrical conductors from the electrical power source engage the terminal lugs by way of the electrical access holes within the rear cover plate;

a cross-insertion prevention key feature between the UEI base and the cartridge to prevent cartridges of a different subset from being inserted into a base for which they are not intended;

a bracket serving as a retainer, wherein the UEI base is affixed to the bracket by use of a mechanical means such as a rivet, a screw or similar, said bracket also retains the cartridge to the UEI base keeping both UEI base and the cartridge together as a single unit when installed into a conventional electrical wall box, the assembly is secured to the electrical wall box with a set of installation screws one at each proximal end of the bracket, said bracket is further electrically connected to earth ground by way of a grounding screw;

a Faceplate intended as a protective and ornamental cover to the UEI base and the cartridge.

2. The UEI base according to claim 1, wherein two or more openings as entry holes are provided for accessing the isolation chambers, wherein the terminal lugs are housed.

3. The UEI base according to claim 1, wherein two or more conductive terminal lugs are contained within the isolation chambers at the UEI base serving as electrical contact points for the cartridge.

4. The UEI base according to claim 1, wherein one or more terminal lugs serve as mechanical anchors preventing the cartridge from coming disengaged from the UEI base.

5. The UEI base according to claim 1, wherein the terminal lugs have specifically assigned conductive inputs at the UEI base and are labeled L1, L2/DC+, L3/DC− and N when intended as a power outlet base.

6. The UEI base according to claim 1, wherein the terminal lugs have specifically assigned conductive inputs and are labeled A, B, C and D when the base is intended for multi-purpose functions other than outlets, such as for switching or other signal applications.

7. The UEI base according to claim 1, wherein the terminal lug material used is non-conductive such as plastic.

8. The UEI base according to claim 1, wherein the cross-insertion prevention key feature has one or more mechanical keys provided at the UEI base as feature identifiers to render said UEI base application specific and to inhibit cross-insertion of cartridges of a different subset not intended for the base.

9. The UEI base according to claim 1, wherein the cross-insertion key feature includes one or more mode keys to further prevent cross-insertion of non-intended cartridges and to differentiate between AC electrical power grid type Delta or Wye, said mode keys can be configured to further help determine DC level at a UEI base.

10. The UEI base according to claim 1, wherein keys forming said cross-insertion key feature are either mechanical, magnetic, optical or electrical such as RFID or other techniques.

11. The UEI base according to claim 1, wherein for safety purpose the terminal lugs are hidden in their own respective isolation chambers restricting easy human physical access and preventing contacts with other electrically energized terminal lugs.

12. The cartridge according to claim 1, wherein two or more hook-shaped terminals from said cartridge establish electrical connection with the terminal lugs at the UEI base to bring voltage and/or signal out to the cartridge.

13. The cartridge according to claim 1, wherein two or more hook-shaped terminals from said cartridge engage the terminal lugs via the entry holes at the UEI base to establish mechanical contact with said terminal lugs.

14. The cartridge according to claim 1, wherein the hook-shaped terminals intended for electrical and mechanical connections are made of copper, brass or any other conductive material.

15. The cartridge according to claim 1, wherein the hook-shaped terminals intended for mechanical connections only are made of plastic or any other non-conductive material.

16. The cartridge according to claim 1, wherein the manner of connecting to the UEI base after gaining access to the entry holes leading to the terminal lugs is by a vertical downward push or an horizontal lateral motion inserting the hooks into the engagement openings of said terminal lugs depending on the UEI base installation orientation.

17. The cartridge according to claim 1, wherein a grounding prong is provided to mechanically secure the cartridge to the bracket while establishing electrical grounding contact with an earth ground line connected to said bracket, said grounding prong is made of conductive material such as steel or any other conductive material.

18. The UEI base according to claim 1, configured as power outlet ports connected to the cartridge, wherein electrically conductive terminal lugs labeled L1, N and ground G are connected to the cartridge making available a single phase voltage VAC to the user.

19. The UEI base according to claim 1, configured as power outlet ports connected to the cartridge, wherein electrically active terminal lugs labeled L1, L2, N and ground G are connected to the cartridge concurrently making available a system voltage AC or a single phase voltage AC to the user from the same platform depending on the cartridge used.

20. The UEI base according to claim 1, configured as power outlet ports connected to the cartridge, wherein electrically active terminal lugs labeled L1, L2, L3, N and ground G are connected to the cartridge concurrently making available a 3-phase AC, or a system voltage AC, or a single phase voltage AC, or a high-leg AC to the user all from the same platform depending on the cartridge used.

21. The UEI base according to claim 1, configured as DC power outlet ports connected to the cartridge, wherein electrically active terminals labeled DC+, DC− and ground G are connected to an internal voltage regulation circuit at the UEI base or the cartridge to output a regulated DC voltage to the user.

22. The UEI base according to claim 1, configured as a hybrid power outlet port connected to the cartridge, wherein electrically active terminals labeled L1, N, DC+, DC− and ground G are connected to the cartridge simultaneously making available both a phase voltage AC and a DC voltage to the user.

23. The UEI base according to claim 1, wherein insertion guides or other such alignment techniques are located on either sides of the UEI base to match corresponding arrows from the cartridge as an indicator of full electrical and mechanical engagement of the cartridge to said UEI base.

24. The Faceplate according to claim 1, wherein a set of built-in latches forming rotating mechanical engagements are used to secure said Faceplate to the UEI base and cartridge assembly without screws and tools.

25. The Faceplate according to claim 1, comprising a cartridge opening through which the cartridge is exposed out of the Faceplate and said Faceplate also has a set of centering holes, wherein by means of said centering holes the Faceplate is positioned over the UEI's installation screws using a set of shoulder washers, the Faceplate is thus centered about the cartridge securing its full engagement onto the UEI base to maintain mechanical and electrical connections.

26. The Faceplate according to claim 1, wherein a set of spring-like engagement tabs located one on each side of the Faceplate engage a series of recessed feature on the sides of the cartridges to present a measure of mechanical resistance to the removal of the Faceplate to render disassembling the system child safe.

27. The bracket according to claim 1, wherein a wedge is provided as a contact interference with the grounding prong from the cartridge to make electrical contact to ground the cartridge and to enhance the mechanical engagement between the cartridge and said bracket.

28. The bracket according to claim 1, wherein an insertion cavity is provided as an access path permitting the grounding prong originating from the cartridge to engage said bracket.

29. A central DC source selector to make DC power available to a building utilizing the UEI base platform, comprising:
  a DC power sense circuit to monitor the presence and need of DC power from a locally situated alternate power generation system;

a central power supply to produce all needed DC power from the AC power grid to be used at night, when the alternate power generation system operation is hindered, non-functioning or when a battery storage system is not present;

a relay based switching circuit to give priority connection to DC originating from any alternate energy generation system or any battery storage system, when either is present, over switching to said central power supply.

30. The central DC source selector according to claim 29, wherein for energy conservation purposes, DC power originates from a single supply source location to minimize loss associated with having multiple AC to DC transformers throughout the home or building, DC power demand at the UEI is monitored by way of the DC power sense circuit, wherein an AC powered transformer is automatically disconnected from the AC power grid shutting down local DC power generation from the AC power grid when alternate DC sources either renewable or battery storage are available and potent enough to satisfy DC power demand.

31. The central DC source selector according to claim 29, wherein DC power to the UEI is channeled from the DC supply source, such power can be retrieved from any battery storage system.

32. The central DC source selector according to claim 29, wherein DC power to the UEI is channeled from the DC supply source, such power can be derived from the central power supply.

33. The central DC source selector according to claim 29, wherein DC power to the UEI is channeled from the DC supply source, such power can be derived from any mode of energy generation, solar, fuel cell or similar conventional or renewable or sustainable energy system.

34. The central DC source selector according to claim 29, wherein by way of the UEI isolation chambers, generated DC power made available to the user, is sequestered from the AC power grid's electrical conductors thereby eliminating possibilities of posing a safety hazard to line crew when effecting line repairs.

35. The central DC source selector according to claim 29, wherein by way of the UEI's isolation chambers, said DC source selector in conjunction with the alternate power generation system form a self-contained home grid, wherein an independent house can remain powered with DC and protected from total absence of electricity due to AC power grid failure caused by a natural disaster, equipment breakdown or a criminal physical or cyber-attack to the AC power grid.

* * * * *